(12) United States Patent
Kato et al.

(10) Patent No.: US 10,116,200 B1
(45) Date of Patent: Oct. 30, 2018

(54) DC/DC CONVERTER DEVICE

(71) Applicant: Mitsubishi Electric Corporation, Tokyo (JP)

(72) Inventors: Shingo Kato, Tokyo (JP); Matahiko Ikeda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/883,709

(22) Filed: Jan. 30, 2018

(30) Foreign Application Priority Data

Sep. 13, 2017 (JP) ................ 2017-175494

(51) Int. Cl.
*H02M 3/158* (2006.01)
*H02M 1/088* (2006.01)
*H02M 1/00* (2006.01)

(52) U.S. Cl.
CPC .......... *H02M 1/088* (2013.01); *H02M 3/158* (2013.01); *H02M 2001/0009* (2013.01)

(58) Field of Classification Search
None
See application file for complete search history.

(56) References Cited

U.S. PATENT DOCUMENTS

| | | | | |
|---|---|---|---|---|
| 2007/0216323 | A1* | 9/2007 | Ishikawa ................ | B60L 11/14 318/9 |
| 2010/0235031 | A1* | 9/2010 | Yoshida .............. | B60L 11/1885 701/22 |
| 2012/0062299 | A1* | 3/2012 | Kurokawa ............. | G01R 23/15 327/237 |
| 2013/0264984 | A1* | 10/2013 | Tamura ................... | H02M 7/48 318/400.27 |
| 2015/0115906 | A1* | 4/2015 | Ebisu ...................... | H02M 1/00 323/217 |

FOREIGN PATENT DOCUMENTS

| JP | 2006-353032 A | 12/2006 |
|---|---|---|
| JP | 2010-004607 A | 1/2010 |

* cited by examiner

*Primary Examiner* — Jeffrey Gblende
(74) *Attorney, Agent, or Firm* — Sughrue Mion, PLLC; Richard C. Turner

(57) ABSTRACT

Provided is a DC/DC converter device capable of suppressing overshooting of an output voltage and fluctuation of an input voltage. The DC/DC converter device includes: a DC/DC converter including a power conversion unit and a reactor; and a control unit. The control unit includes a rate-of-change limiting value setting unit configured to set a rate-of-change limiting value for the output voltage target value, and is configured to limit the output voltage command value by using the rate-of-change limiting value, to thereby generate the output voltage target value. The rate-of-change limiting value setting unit is configured to obtain an index value for quantitatively evaluating an amount of fluctuation in the input voltage, to thereby change a setting of the rate-of-change limiting value in such a direction as to narrow a rate-of-change limiting range when the index value is within a predetermined specific range.

19 Claims, 21 Drawing Sheets

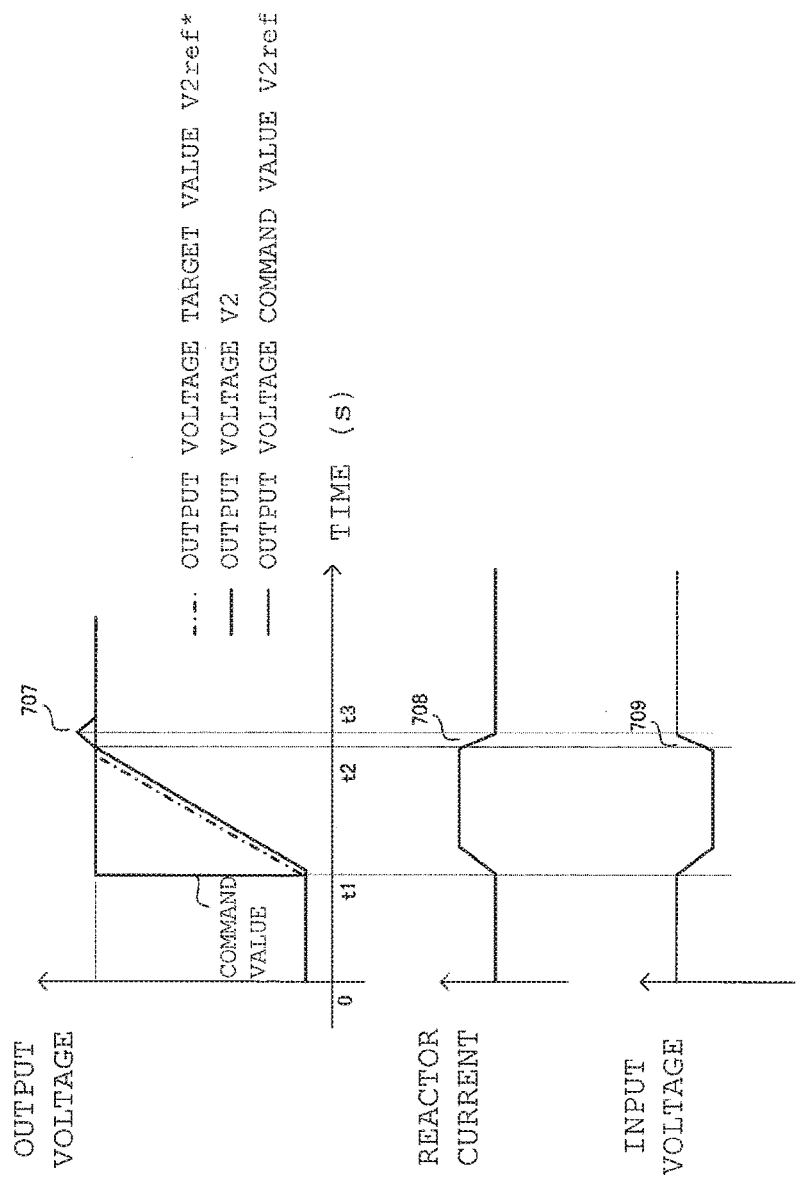

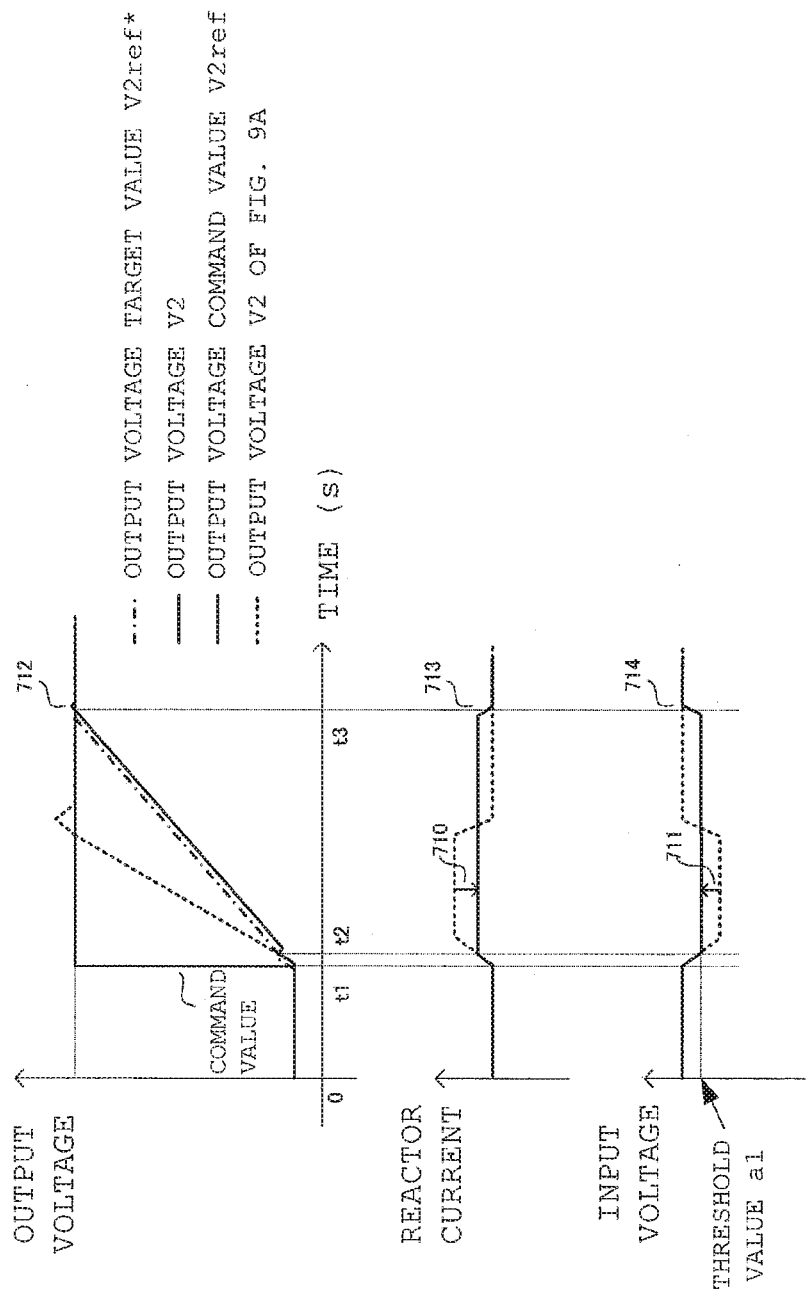

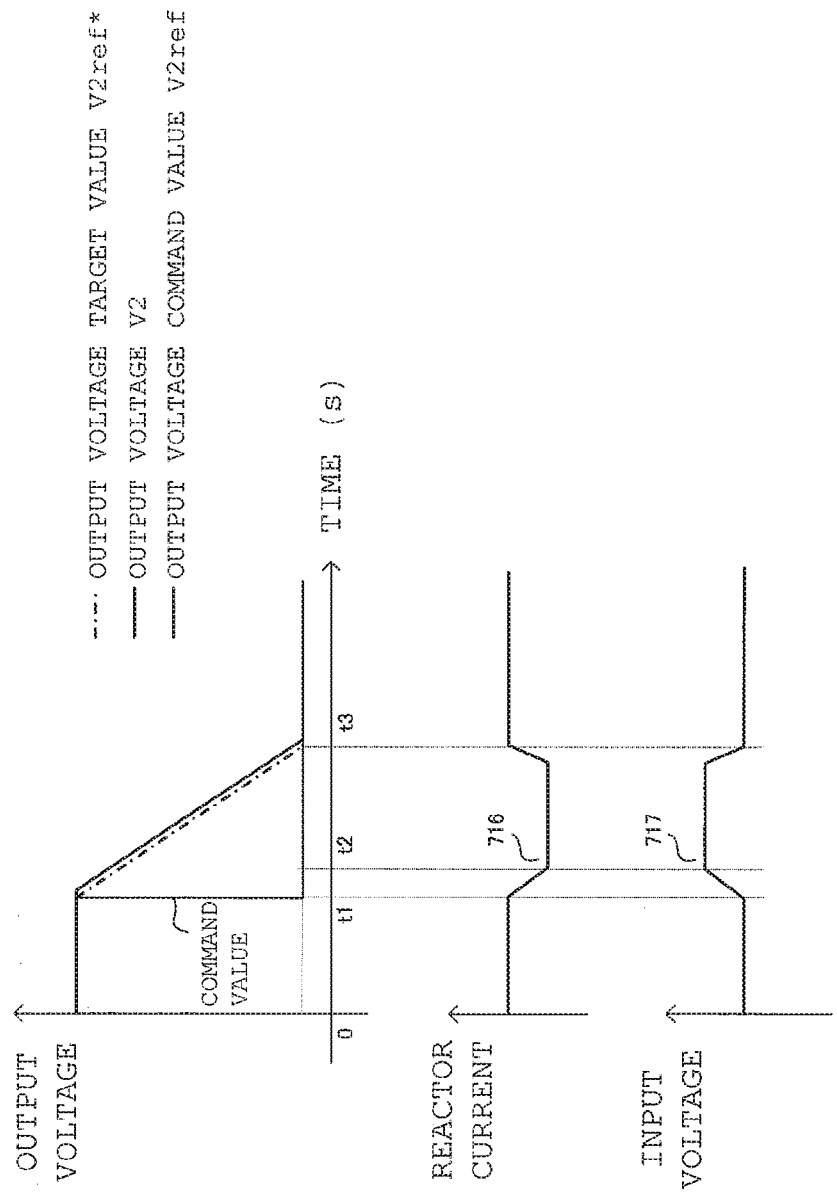

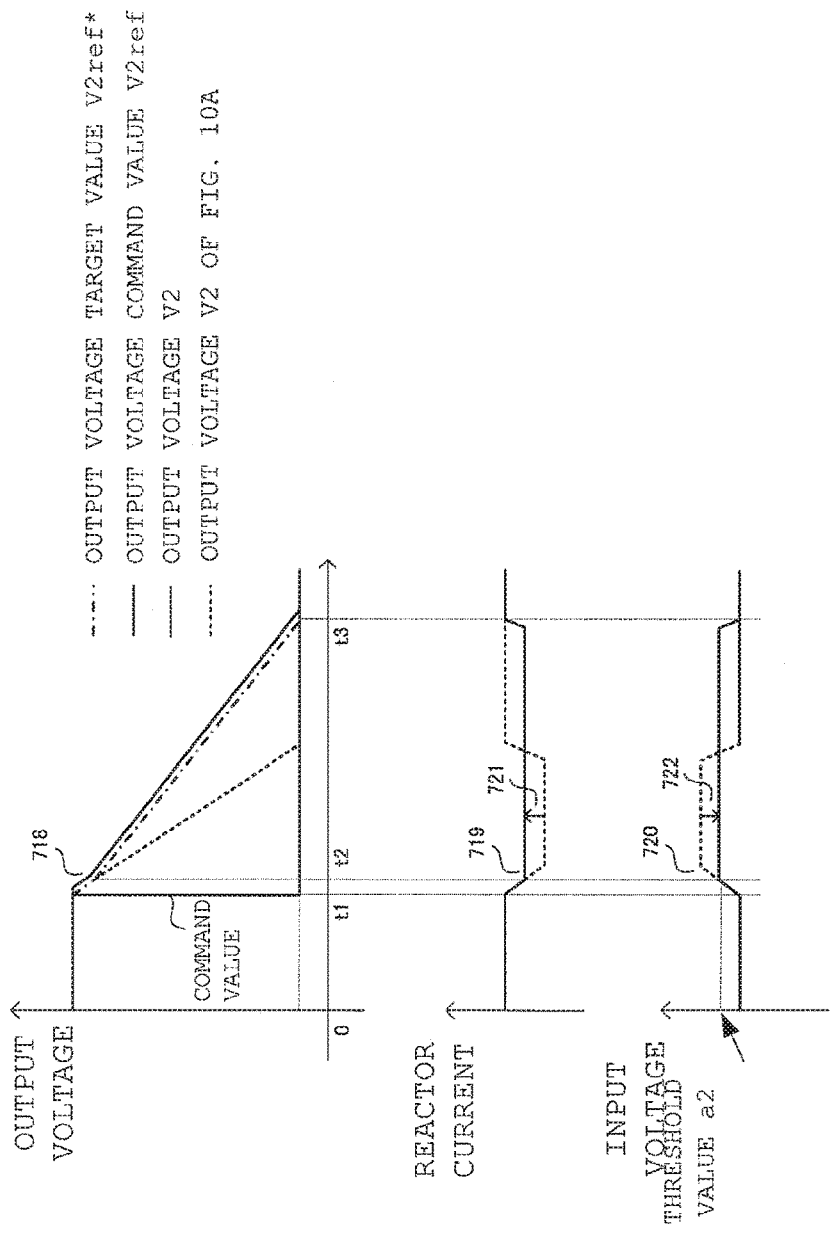

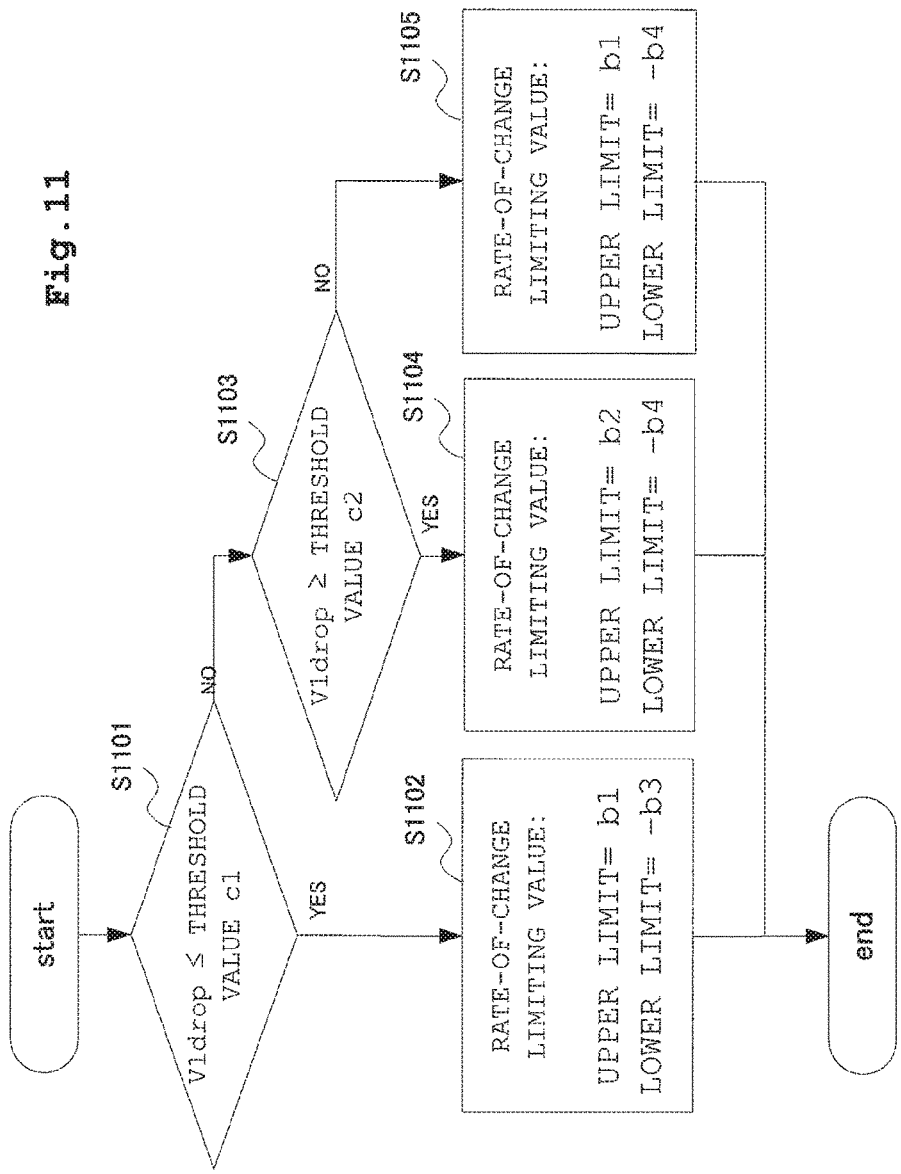

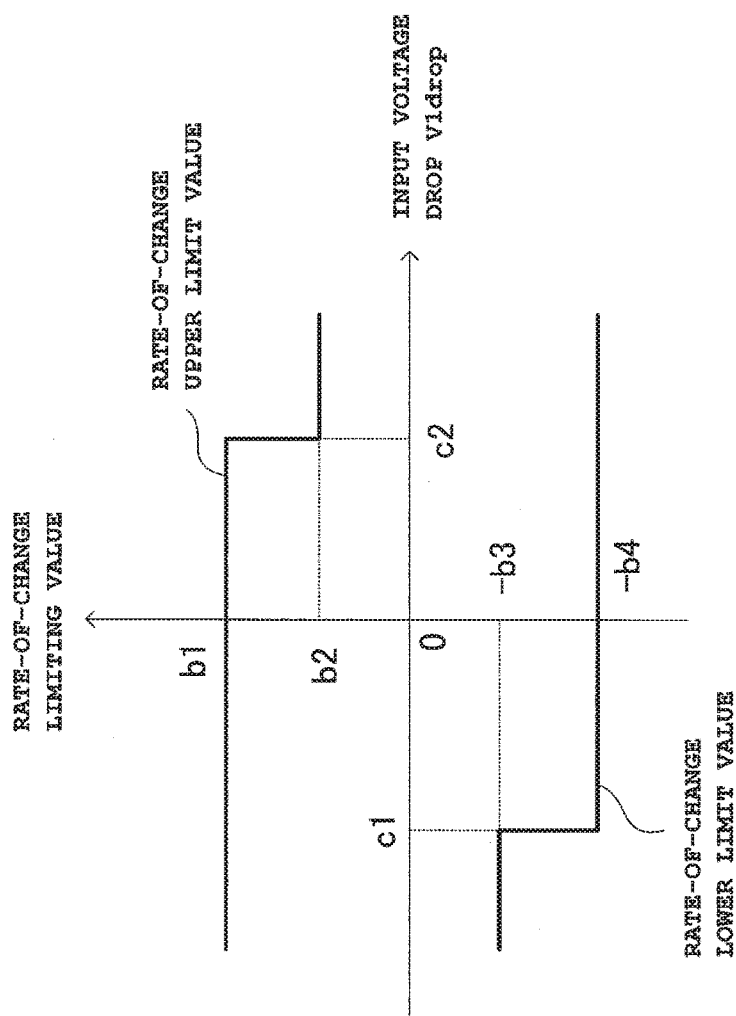

DC/DC CONVERTER DEVICE

BACKGROUND OF THE INVENTION

1. Field of the Invention

The present invention relates to a DC/DC converter device configured to step up or step down a DC voltage supplied from a DC power source to output an output voltage.

2. Description of the Related Art

Hitherto, there has been proposed a technology of stably controlling output in a DC/DC converter configured to step up or step down a DC voltage supplied from a DC power source (see, for example, Japanese Patent Application Laid-open No. 2006-353032 and Japanese Patent Application Laid-open No. 2010-4607).

A technology shown in Japanese Patent Application Laid-open No. 2006-353032 has the function of controlling the output voltage of the DC/DC converter such that the output voltage matches with an output voltage target value that is set based on an output voltage command value, in order to suppress overshooting of the output voltage. The output voltage target value here is set taking a rate of change in the output voltage target value as variable in accordance with the magnitude of an output voltage command value at the control timing of the moment.

The technology shown in Japanese Patent Application Laid-open No. 2010-4607 is characterized by performing primary delay processing on the output voltage command value to set the output voltage target value.

However, the related art each have problems as described below. In the related art in Japanese Patent Application Laid-open No. 2006-353032 and Japanese Patent Application Laid-open No. 2010-4607, no consideration has been given to an influence of an internal impedance of a DC power source connected to the input side of the DC/DC converter or an influence of a wiring impedance due to connection between the input side of the DC/DC converter and the DC power source. Accordingly, the related art has the problem of being unable to suppress overshooting of an output voltage and a rise of an input voltage, which are caused by a voltage drop that occurs due to the internal impedance of the DC power source and the wiring impedance between the DC power source and the DC/DC converter.

SUMMARY OF THE INVENTION

The present invention has been made to solve the above-mentioned problems, and an object of the present invention is to provide a DC/DC converter device capable of suppressing overshooting of an output voltage and a rise of an input voltage.

According to one embodiment of the present invention, there is provided a DC/DC converter device including: a DC/DC converter including a power conversion unit configured to step up or step down an input voltage supplied from a DC power source to output an output voltage, and a reactor connected between the power conversion unit and the DC power source; and a control unit configured to generate an output voltage target value in accordance with an output voltage command value to control the power conversion unit such that the output voltage follows the output voltage target value, in which the control unit includes a rate-of-change limiting value setting unit configured to set a rate-of-change limiting value for the output voltage target value, and is configured to limit the output voltage command value by using the rate-of-change limiting value, to thereby generate the output voltage target value, and in which the rate-of-change limiting value setting unit is configured to obtain an index value for quantitatively evaluating an amount of fluctuation in the input voltage supplied to the DC/DC converter, to thereby change a setting of the rate-of-change limiting value in such a direction as to narrow a rate-of-change limiting range when the index value is within a predetermined specific range.

The present invention has a configuration in which the rate-of-change limiting value for the output voltage target value of the DC/DC converter can be set appropriately so as to set a narrow rate-of-change limiting range when a specific condition is satisfied. Consequently, it is possible to obtain the DC/DC converter device capable of suppressing the overshooting of the output voltage and the rise of the input voltage, which are caused by a voltage drop that occurs due to an internal impedance and a wiring impedance.

BRIEF DESCRIPTION OF THE DRAWINGS

FIG. 9A is a graph for showing time waveforms of an output voltage, a reactor current, and an input voltage when an output voltage command value rises stepwise in a related-art DC/DC converter device.

FIG. 9B is a graph for showing time waveforms of an output voltage, a reactor current, and an input voltage when an output voltage command value rises stepwise in the first embodiment of the present invention.

FIG. 10A is a graph for showing time waveforms of the output voltage, the reactor current, and the input voltage when the output voltage command value falls stepwise in the related-art DC/DC converter device.

FIG. 10B is a graph for showing time waveforms of the output voltage, the reactor current, and the input voltage when the output voltage command value falls stepwise in the first embodiment of the present invention.

FIG. 11 is a flowchart for illustrating processing of setting a rate-of-change limiting value for an output voltage target value in a second embodiment of the present invention.

FIG. 12 is a graph for showing the relationship of an input-side voltage drop and the rate-of-change limiting value for the output voltage target value in the second embodiment of the present invention.

DESCRIPTION OF THE EMBODIMENTS

Now, DC/DC converter devices according to preferred embodiments of the present invention are described with reference to the drawings.

First Embodiment

Figure 1:
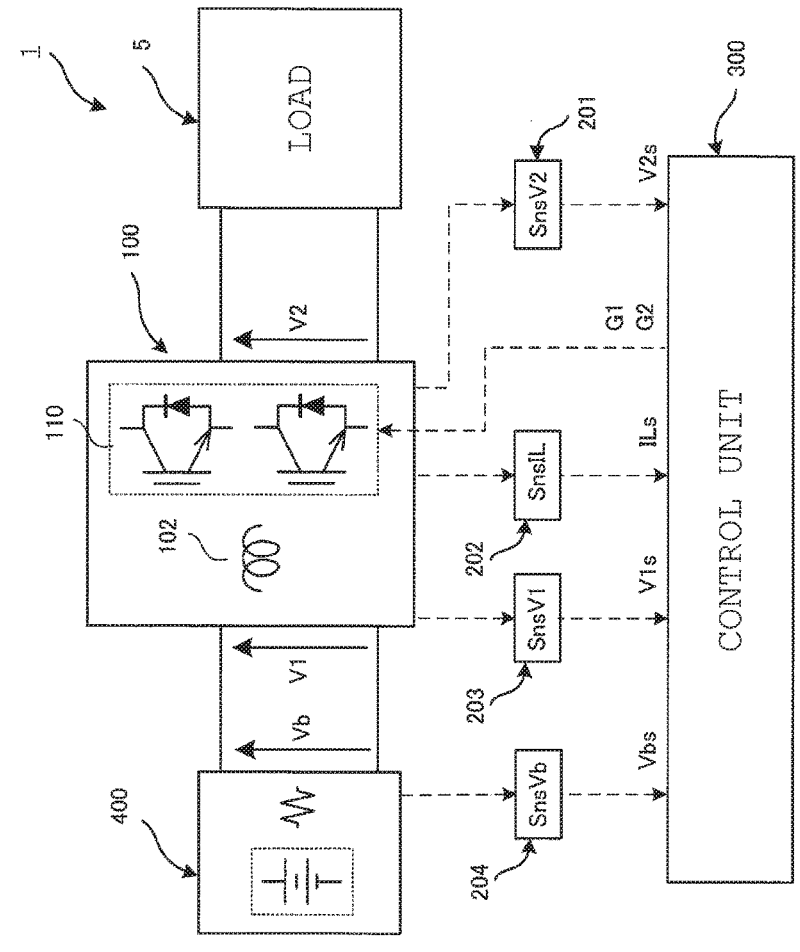
FIG. 1 is a functional block diagram of a device to which a DC/DC converter of a first embodiment of the present invention is applied.

FIG. 1 is a functional block diagram of a device to which a DC/DC converter of a first embodiment of the present invention is applied. As illustrated in FIG. 1, a device 1 includes a DC/DC converter 100, a DC power source 400 (hereinafter referred to as a power source 400), a load 5, and a control unit 300. The power source 400 is connected to an input-side terminal of the DC/DC converter 100, and the load 5 is connected to an output-side terminal of the DC/DC converter 100. A power conversion unit 110 including at least one pair of switching elements and a reactor 102 are provided inside the DC/DC converter 100.

A voltage sensor (SnsV2) 201 detects an output voltage V2 of the DC/DC converter 100. A current sensor (SnsIL) 202 detects a reactor current IL in the DC/DC converter 100. A voltage sensor (SnsV1) 203 detects an input voltage V1 that is input from the power source 400 to the DC/DC converter 100. A voltage sensor (SnsVb) 204 detects an output terminal voltage Vb of the power source 400. The values detected by the voltage sensors 201, 203, and 204 and the current sensor 202 are each output to the control unit 300. The DC/DC converter 100 has the function of enabling bidirectional power conversion between an input side and an output side thereof. The DC/DC converter 100 steps up the input voltage V1 input from the power source 400 to a voltage equal to or larger than the input voltage V1, and outputs an output voltage V2 after the step-up to the output-side terminal.

The control unit 300 has the function of controlling the DC/DC converter 100 and the function of integrally controlling the device 1. A detail of the control unit 300 is described later with reference to FIG. 3.

The load 5 is, for example, an electric motor. When an AC electric motor is used as the load 5, the DC/DC converter 100 may be configured so as to be connected to the AC electric motor via an inverter circuit (not shown).

For the power source 400, a storage battery, such as a lithium-ion battery or a nickel-hydrogen battery, or a capacitor can be employed.

Figure 2:
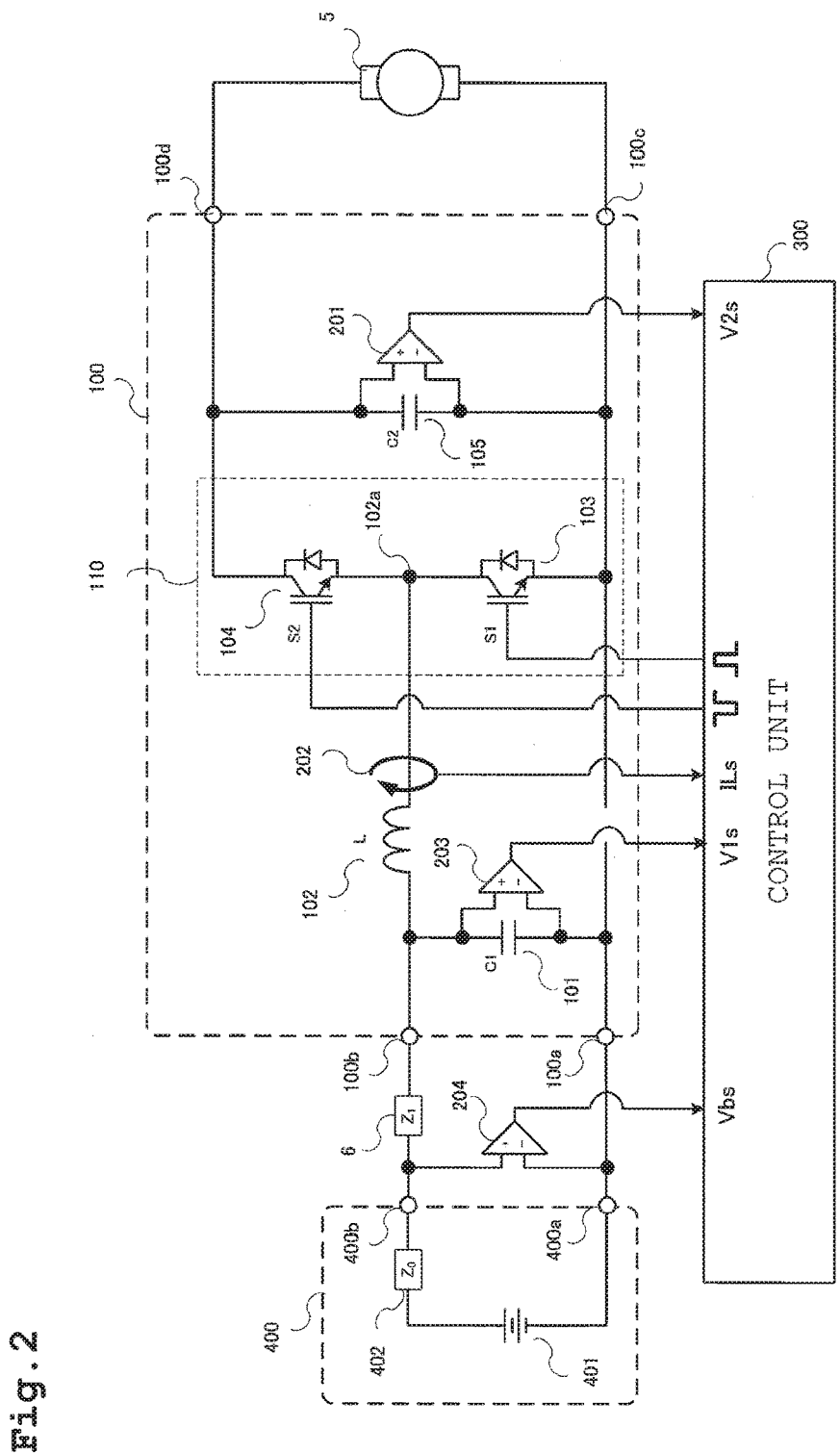
FIG. 2 is a circuit configuration diagram of the device to which the DC/DC converter of the first embodiment of the present invention is applied.

FIG. 2 is an example of a circuit configuration diagram of the device to which the DC/DC converter of the first embodiment of the present invention is applied. Like portions as the portions in the functional block diagram of FIG. 1 are denoted with like reference symbols and description thereof is omitted.

In FIG. 2, the power conversion unit 110 inside the DC/DC converter 100 has the function of enabling bidirectional power conversion between the input side and the output side of the DC/DC converter 100. The DC/DC converter 100 includes a first terminal 100a and a second terminal 100b on the input side and includes a third terminal 100c and a fourth terminal 100d on the output side.

The DC/DC converter 100 steps up a DC input voltage V1, which is input between the first terminal 100a (Vcom) and the second terminal 100b (VL) on the input side, to a voltage equal to or larger than the input voltage V1. Further, the DC/DC converter 100 outputs an output voltage V2 after the step-up between the third terminal 100c (Vcom) and the fourth terminal 100d (VH) on the output side. The power source 400 is connected between the first terminal 100a and the second terminal 100b, and the load 5 is connected between the third terminal 100c and the fourth terminal 100d.

The DC/DC converter 100 includes an input-side smoothing capacitor C1 (101), an output-side smoothing capacitor C2 (105), a reactor L (102), a first switching element S1 (103), and a second switching element S2 (104).

The input-side smoothing capacitor C1 (101) has one terminal connected to the first terminal 100a and another terminal connected to the second terminal 100b, and smoothes the input voltage V1. The first terminal 100a and the third terminal 100c are connected in common. The first terminal 100a and the third terminal 100c are set to have the common potential (Vcom), and hence any one of the first terminal 100a and the third terminal 100c may be omitted.

The reactor L (102) is used for storing energy, and has one terminal connected to the input-side second terminal 100b and another terminal connected to a first junction 102a being a junction between the switching element S1 (103) and the switching element S2 (104).

The switching element S1 (103) and the switching element S2 (104) are configured by, for example, combination of an insulated gate bipolar transistor (IGBT) and an anti-parallel diode.

One terminal of the switching element S1 (103) is connected to the first junction 102a and another terminal thereof is connected to the first terminal 100a. One terminal of the switching element S2 (104) is connected to the first junction 102a and another terminal thereof is connected to the fourth terminal 100d.

More specifically, an emitter terminal of the switching element S1 (103) is connected to the first terminal 100a, and a collector terminal of the switching element S2 (104) is connected to the fourth terminal 100d. A collector terminal of the switching element S1 (103) and an emitter terminal of the switching element S2 (104) are connected to the first junction 102a. The first junction 102a is connected to the second terminal 100b via the reactor L (102).

The voltage sensor 204 detects an output terminal voltage of the power source 400 as a detected power source output terminal voltage value Vbs. The voltage sensor 203 detects a voltage across both ends of the input-side smoothing capacitor C1 (101) of the DC/DC converter 100 as a detected input voltage value V1s.

The voltage sensor 201 detects a voltage across both ends of the output-side smoothing capacitor C2 (105) of the DC/DC converter 100 as a detected output voltage value V2s. The current sensor 202 detects a reactor current IL flowing through the reactor L (102) in the DC/DC converter 100. The values detected by the respective sensors are output to the control unit 300.

Based on output from the voltage sensor 201, the current sensor 202, and the voltage sensor 203, the control unit 300 generates gate signals (G1 and G2) of the two switching elements S1 and S2 and separately turns on/off the switching element S1 (103) and the switching element S2 (104).

The power source 400 includes a voltage source 401 and supplies a power source output terminal voltage Vb between a first terminal 400a (Vcom) and a second terminal 400b (VB) of the power source 400.

A power source internal impedance Z0 (402) is an impedance between the voltage source 401 and the second terminal 400b (VB) of the power source 400. Further, a wiring impedance Z1 (6) is an impedance of wiring connecting between the second terminal 400b (VB) of the power source 400 and the second terminal 100b (VL) of the DC/DC converter 100.

The first terminal 400a (Vcom) of the power source 400 is connected to the first terminal 100a (Vcom) of the DC/DC converter 100. Meanwhile, the second terminal 400b (VB) of the power source 400 is connected to the second terminal 100b (VL) of the DC/DC converter 100 via the wiring impedance Z1 (6).

As illustrated in FIG. 2, a DC current supplied from the voltage source 401 to the DC/DC converter 100 is supplied to the second terminal 100b (VL) of the DC/DC converter 100 via the power source internal impedance Z0 (402), the second terminal 400b (VB) of the power source 400, and the wiring impedance Z1 (6).

In this manner, when a current flows from the voltage source 401 to the input side of the DC/DC converter 100, a power source internal voltage drop AV1b occurs in the power source internal impedance Z0 (402). Further, a wiring voltage drop AV1a occurs in the wiring impedance Z1 (6).

Figure 3:
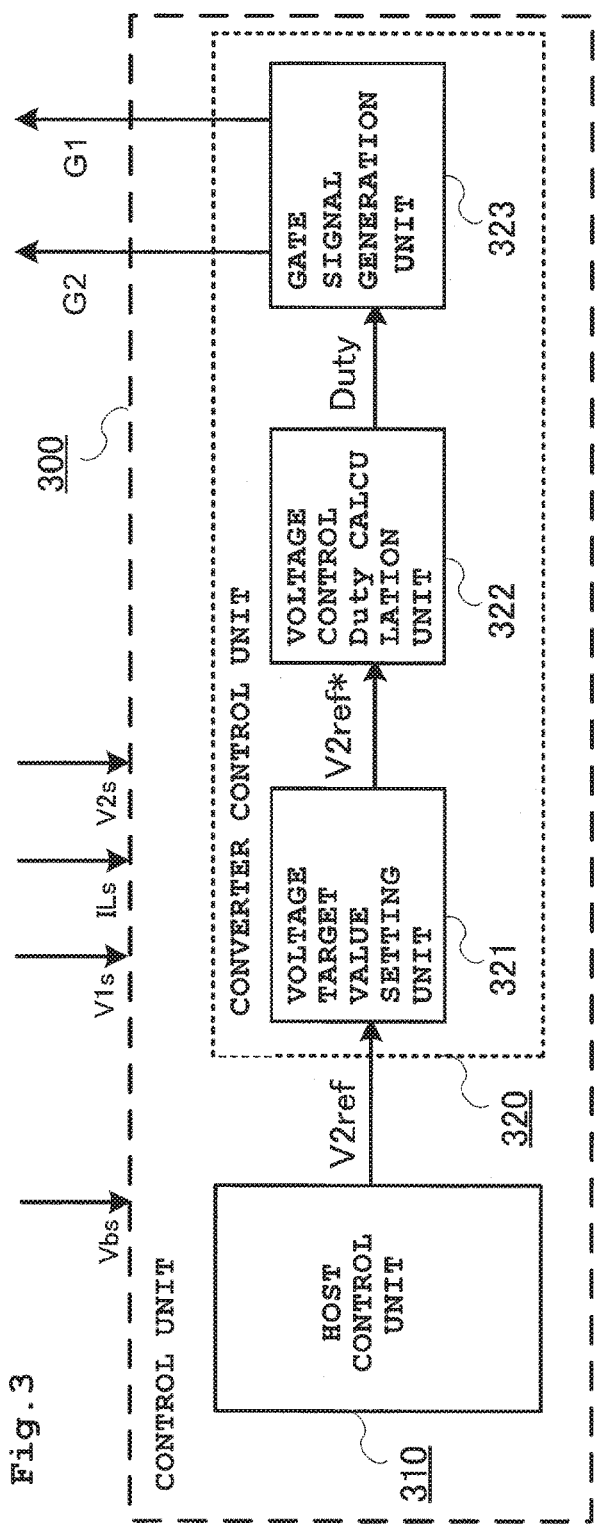
FIG. 3 is a functional block diagram of a control unit in the first embodiment of the present invention.

Next, the function of the control unit 300 is described with reference to FIG. 3. FIG. 3 is a functional block diagram of the control unit 300 illustrated in FIG. 2 in the first embodiment of the present invention. The control unit 300 includes a host control unit 310 for integrally controlling the device 1 and a converter control unit 320 for controlling the DC/DC converter 100.

In the first embodiment of the present invention, a DC/DC converter device represents a device having the functions of the DC/DC converter 100 and the converter control unit 320.

Although the control unit 300 is illustrated in FIG. 3 so as to include the host control unit 310 and the converter control unit 320, the converter control unit 320 is not necessarily required to be arranged inside the control unit 300. For example, the converter control unit 320 may be provided inside the DC/DC converter 100. Further, each control unit includes a processor, for example, a CPU (not shown) and a memory for storing a processing program and the like.

Based on operation states of the power source 400, the DC/DC converter 100, and the load 5, the host control unit 310 calculates an output voltage command value V2ref and outputs the calculated result to the converter control unit 320.

The converter control unit 320 includes a voltage target value setting unit 321, a voltage control Duty calculation unit 322, and a gate signal generation unit 323.

The voltage target value setting unit 321 limits a rate of change in the output voltage command value V2ref by using a rate-of-change limiting value to generate an output voltage target value V2ref*. The voltage target value setting unit 321 outputs the generated output voltage target value V2ref* to the voltage control Duty calculation unit 322. Details of the configuration and processing of the voltage target value setting unit 321 are described later.

The voltage control Duty calculation unit 322 performs feedback control such that the detected output voltage value V2s matches with the output voltage target value V2ref*, and outputs a Duty for defining the on/off timing of the switching elements.

Based on the Duty output from the voltage control Duty calculation unit 322, the gate signal generation unit 323 generates gate signals for controlling the switching elements. Further, the gate signal generation unit 323 outputs the generated gate signals to the power conversion unit 110 of the DC/DC converter 100.

More specifically, the gate signal generation unit 323 outputs a generated gate signal G1 to the switching element S1 (103) of the DC/DC converter 100, and outputs a generated gate signal G2 to the switching element S2 (104) of the DC/DC converter 100. In this manner, the converter control unit 320 separately controls the drive of the switching element S1 (103) and the drive of the switching element S2 (104).

Figure 4:
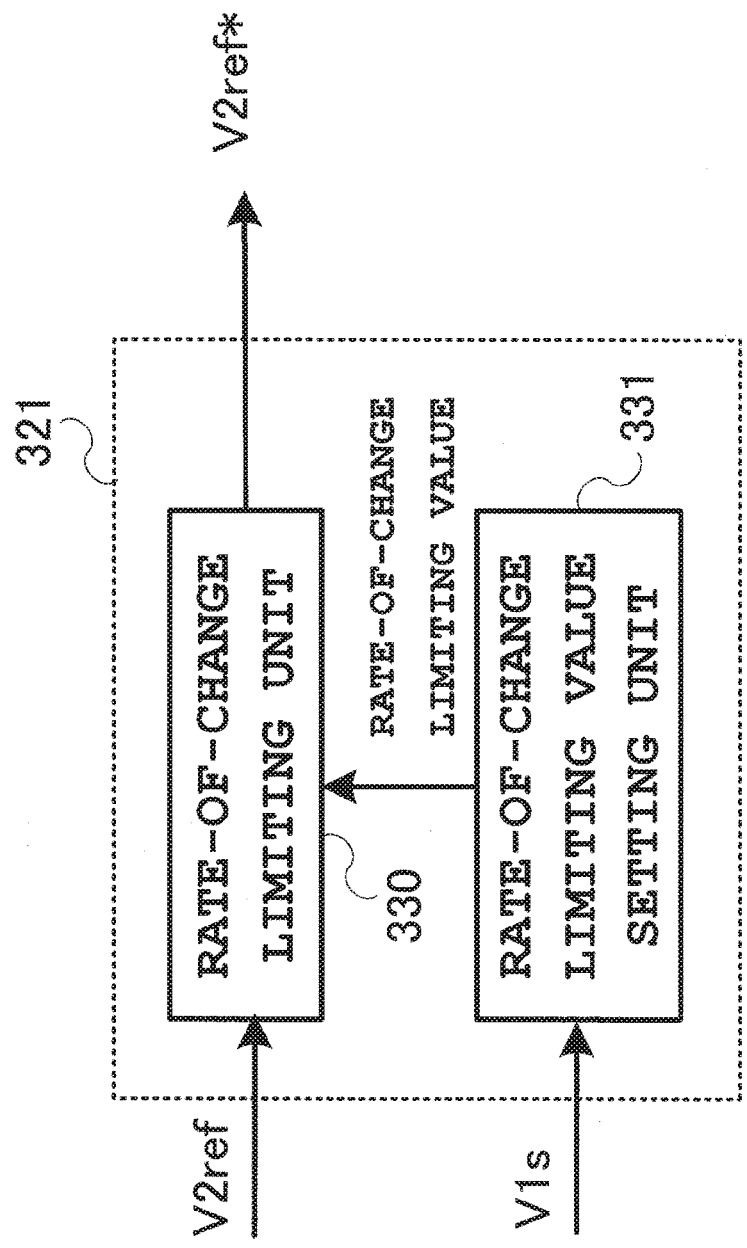
FIG. 4 is a functional block diagram of a voltage target value setting unit in the first embodiment of the present invention.

FIG. 4 is a functional block diagram of the voltage target value setting unit 321 in the first embodiment of the present invention. The voltage target value setting unit 321 includes a rate-of-change limiting unit 330 and a rate-of-change limiting value setting unit 331.

In the first embodiment of the present invention, there is described a case of variably setting a rate-of-change limiting value for an output voltage target value by taking the detected input voltage value V1s as an index value for quantitatively evaluating an amount of fluctuation in the input voltage V1 supplied to the DC/DC converter 100 in accordance with the magnitude of the output voltage V2.

Based on the above-mentioned detected input voltage value V1s being the index value, which is output from the voltage sensor 203, the rate-of-change limiting value setting unit 331 sets the rate-of-change limiting value for the output voltage target value and outputs the result to the rate-of-change limiting unit 330. Specifically, the rate-of-change limiting value setting unit 331 outputs a rate-of-change upper limit value and a rate-of-change lower limit value as the rate-of-change limiting value for the output voltage target value.

The rate-of-change limiting unit 330 generates the output voltage target value V2ref* based on the output voltage command value V2ref. At that time, the rate-of-change limiting unit 330 limits the rate of change in the output voltage command value V2ref by using the rate-of-change upper limit value and the rate-of-change lower limit value that are output from the rate-of-change limiting value setting unit 331 to generate the output voltage target value V2ref*.

The rate-of-change limiting value setting unit 331 of FIG. 4 may further have the function of applying a filter to the detected input voltage value V1s to perform calculation processing. In that case, in place of the detected input voltage value V1s, a detected input voltage value V1s* after filtering processing, which is obtained by performing calculation while applying the filter to the detected input voltage value V1s, can be taken as the index value and used for the setting of the rate-of-change limiting value by the rate-of-change limiting value setting unit 331.

Next, a detail of the setting of the rate-of-change limiting value for the output voltage target value in accordance with the detected input voltage value V1s is described. The rate-of-change limiting value setting unit 331 stores, in a storage unit (not shown) in advance, a plurality of threshold values with respect to the detected input voltage value V1s, and set values for a plurality of rate-of-change limiting values associated with the threshold values.

First, the rate-of-change limiting value setting unit 331 determines the current magnitude of the detected input voltage value V1s by using the plurality of threshold values set in advance. Subsequently, of the plurality of rate-of-change limiting values set in advance, the rate-of-change limiting value setting unit 331 extracts from the storage unit a set value corresponding to the determination result of the current magnitude of the detected input voltage value V1s, and sets the extracted value as a rate-of-change limiting value for the output voltage command value V2ref.

Figure 5:
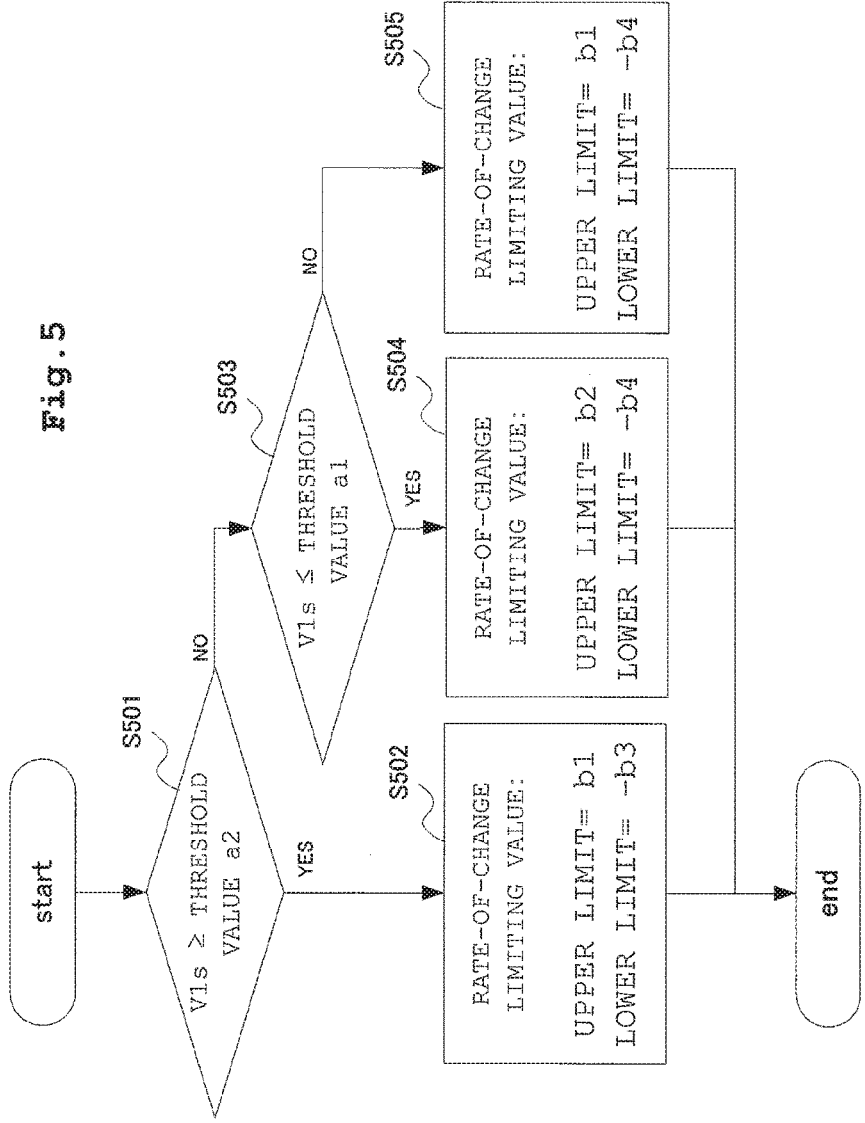
FIG. 5 is a flowchart for illustrating processing of setting a rate-of-change limiting value for an output voltage target value in the first embodiment of the present invention.
Figure 6:
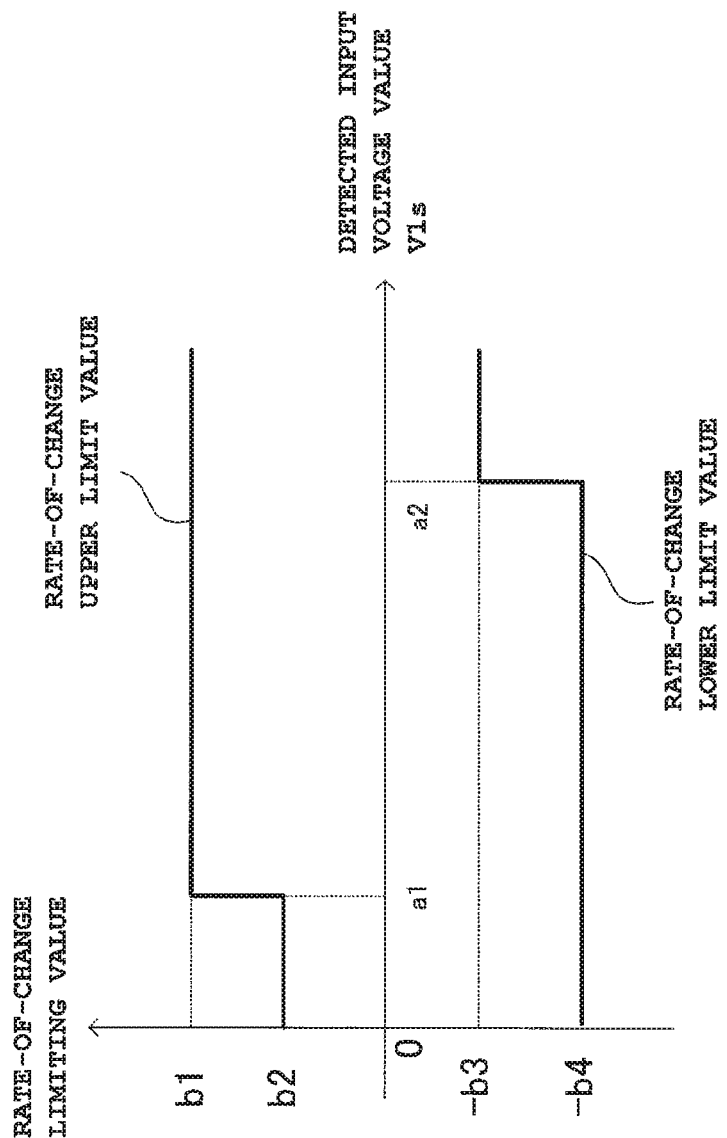
FIG. 6 is a graph for showing the relationship of a detected input voltage value and an upper limit value and a lower limit value of the rate-of-change limiting value for the output voltage target value in the first embodiment of the present invention.

Next, the operation of setting the rate-of-change limiting value for the output voltage command value V2ref is described in detail with reference to FIG. 5 and FIG. 6. FIG. 5 is a flowchart for illustrating processing of setting a rate-of-change limiting value for an output voltage target value in the rate-of-change limiting value setting unit 331 of the first embodiment of the present invention. FIG. 6 is an explanatory graph for showing the relationship of threshold values a1 and a2 of the detected input voltage value V1s and set values b1, b2, −b3, and −b4 of the rate-of-change limiting value for the output voltage target value illustrated in the flowchart of FIG. 5 in the first embodiment of the present invention. In this context, the threshold values are in the relationship of a1>a2, and the set values are in the relationship of b1>b2>−b3>−b4.

In Step S501 of FIG. 5, the rate-of-change limiting value setting unit 331 in the voltage target value setting unit 321 determines whether the detected input voltage value V1s is equal to or larger than the threshold value a2. When determining that the detected input voltage value V1s is equal to or larger than the threshold value a2 (V1s≥threshold value a2: YES), the rate-of-change limiting value setting unit 331 proceeds to Step S502, and sets the upper limit value of the rate-of-change limiting value to the set value b1, and the lower limit value thereof to the set value −b3.

When determining that the detected input voltage value V1s is smaller than the threshold value a2 (V1s≥threshold value a2: NO) in Step S501, the rate-of-change limiting value setting unit 331 proceeds to Step S503 and determines whether the detected input voltage value V1s is equal to or smaller than the threshold value a1. When determining that the detected input voltage value V1s is equal to or smaller than the threshold value a1 (V1s≤threshold value a1: YES), the rate-of-change limiting value setting unit 331 proceeds to Step S504, and sets the upper limit value of the rate-of-change limiting value to the set value b2, and the lower limit value thereof to the set value −b4.

When determining that the detected input voltage value V1s is smaller than the threshold value a2 (V1s≥threshold value a2: NO) and larger than the threshold value a1 (V1s≤threshold value a1: NO), the rate-of-change limiting value setting unit 331 proceeds to Step S505, and sets the upper limit value of the rate-of-change limiting value to the set value b1, and the lower limit value thereof to the set value −b4.

The rate-of-change limiting value setting unit 331 outputs the set upper limit value and lower limit value of the rate-of-change limiting value to the rate-of-change limiting unit 330. The rate-of-change limiting unit 330 applies the set upper limit value and lower limit value of the rate-of-change limiting value to the calculated output voltage target value V2ref* to limit the output voltage target value V2ref*, and outputs the limited output voltage target value V2ref* as output of the voltage target value setting unit 321 to the voltage control Duty calculation unit 322.

FIG. 6 is a summary of the above-mentioned processing results. As shown in FIG. 6, only when the detected input voltage value V1s is a value equal to or larger than the predetermined value (V1s≥threshold value a2), the voltage target value setting unit 321 changes the lower limit value of the rate of change in the output voltage target value V2ref* in such a direction as to raise the lower limit value, that is, in such a direction as to reduce a lower limit width.

Further, only when the detected input voltage value V1s is a value equal to or smaller than the predetermined value (V1s≥threshold value a1), the voltage target value setting unit 321 changes the upper limit value of the rate of change in the output voltage target value V2ref* in such a direction as to lower the upper limit value, that is, in such a direction as to reduce an upper limit width.

Next, the relationship between the rate-of-change limiting value for the output voltage target value and time waveforms of the output voltage, the reactor current, and the input voltage of the DC/DC converter device is described.

Figure 7:
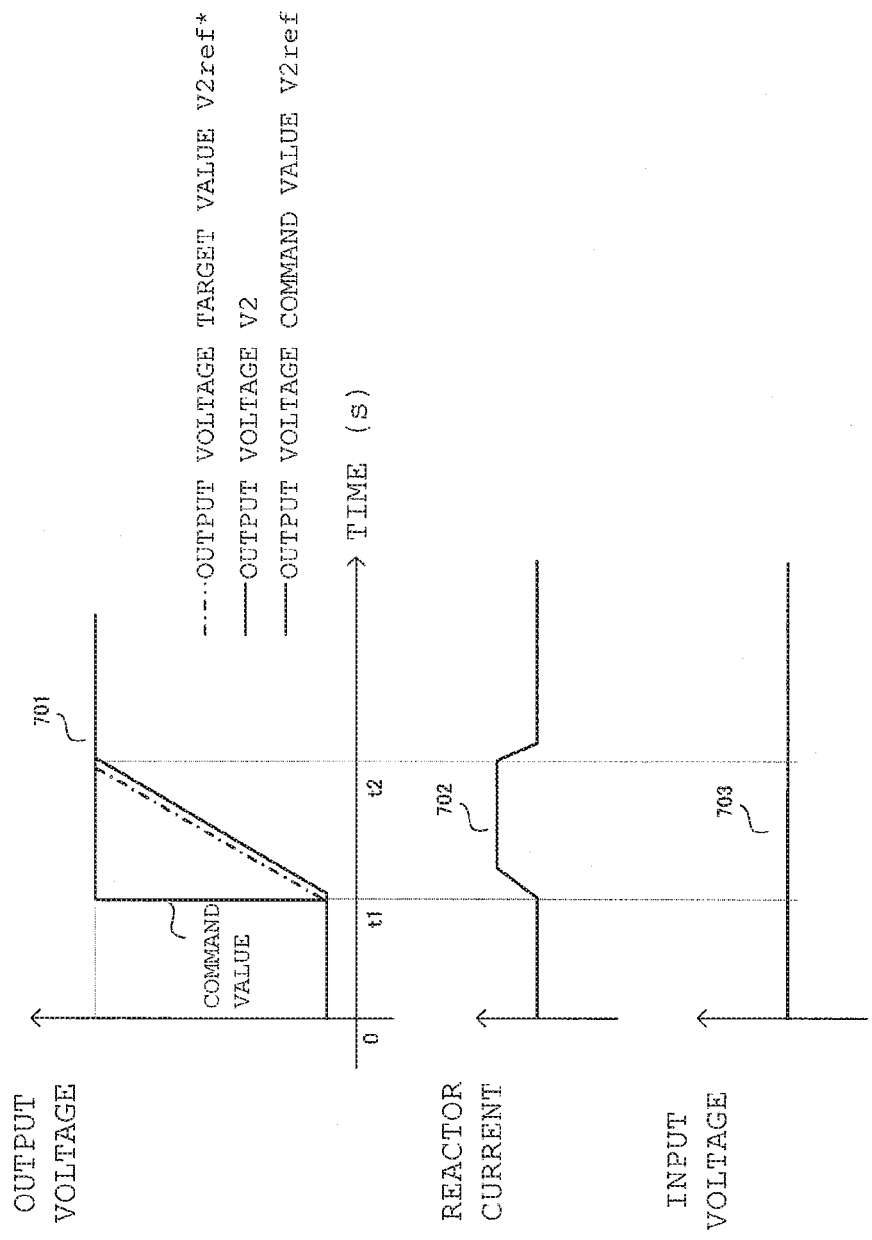
FIG. 7 is a graph for showing time waveforms of an output voltage, a reactor current, and an input voltage when an output voltage command value rises stepwise.
Figure 8:
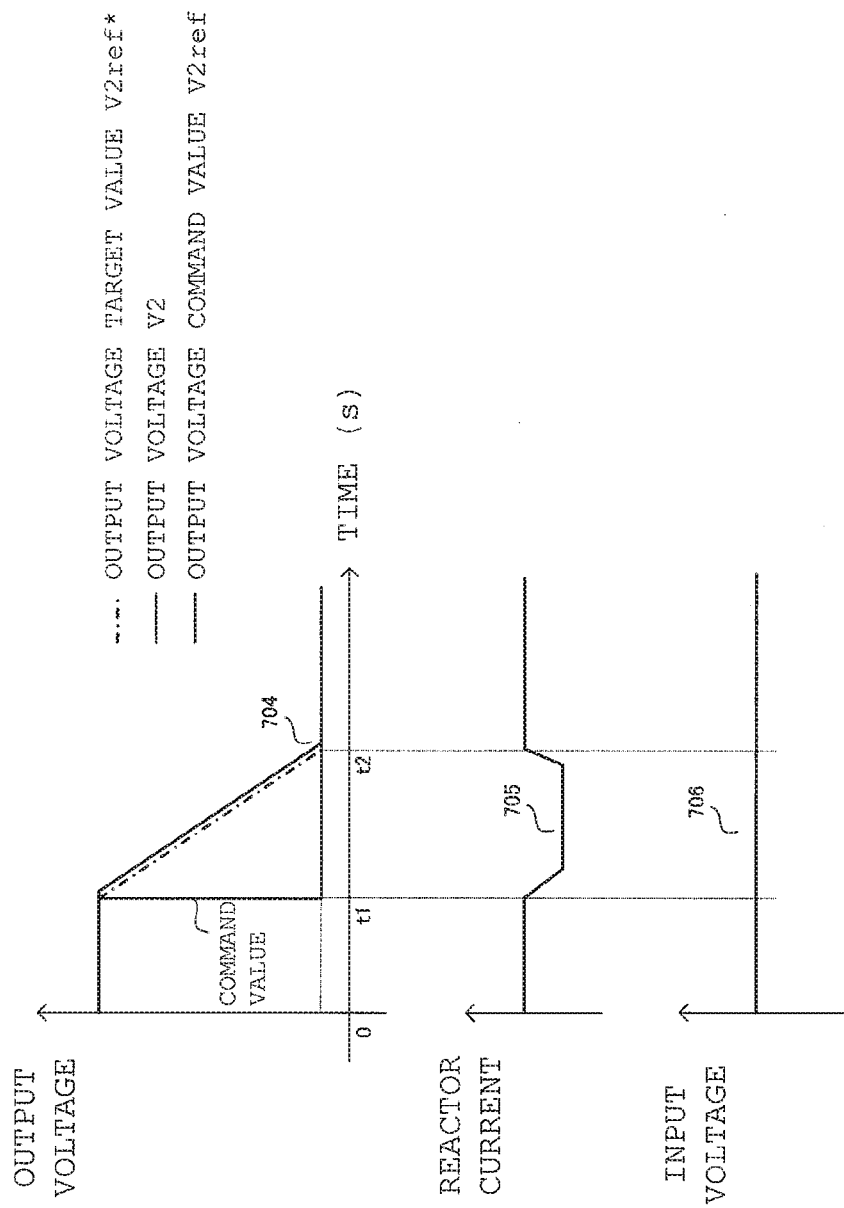
FIG. 8 is a graph for showing time waveforms of the output voltage, the reactor current, and the input voltage when the output voltage command value falls stepwise.

First, the time waveforms in a case where no fluctuation occurs in the input voltage are described with reference to FIG. 7 and FIG. 8. FIG. 7 is a graph in a case where the output voltage command value V2ref changes so as to rise stepwise in the first embodiment of the present invention. FIG. 8 is a graph in a case where the output voltage command value V2ref changes so as to fall stepwise in the first embodiment of the present invention.

For example, overshooting of the output voltage may occur due to a change in the output voltage target value at a time t2 of FIG. 7 and FIG. 8. However, this is not a phenomenon due to fluctuation in the input voltage, and its description is thus omitted.

In FIG. 7, the output voltage command value V2ref changes so as to rise stepwise at a time t1. Subsequently, from the time t1 to t2, the converter control unit controls the switching elements of the power conversion unit 110 such that the output voltage V2 matches with the output voltage target value V2ref*, and as a result, increases the reactor current IL (702 of FIG. 7).

In FIG. 7, there is assumed a case in which fluctuation in the input voltage V1 due to the wiring impedance Z1 and the power source internal impedance Z0 does not occur. Thus, even when the reactor current IL increases, the input voltage V1 holds a constant value (703 of FIG. 7). No fluctuation occurs in the input voltage V1, and hence overshooting of the output voltage V2 due to the input voltage V1 does not occur (701 of FIG. 7).

In FIG. 8, the output voltage command value V2ref changes so as to fall stepwise at the time t1. Subsequently, from the time t1 to t2, the converter control unit decreases the reactor current IL such that the output voltage V2 matches with the output voltage target value V2ref* (705 of FIG. 8).

In FIG. 8, as in FIG. 7, there is assumed a case in which fluctuation in the input voltage V1 due to the wiring impedance Z1 and the power source internal impedance Z0 does not occur. Thus, even when the reactor current IL decreases, the input voltage V1 holds a constant value (706 of FIG. 8).

As described with reference to FIG. 7 and FIG. 8 above, when no fluctuation occurs in the input voltage V1, the overshooting of the output voltage V2 due to the input voltage V1 does not occur. However, in an actual operating state of the DC/DC converter, there may occur fluctuation in the input voltage V1 due to the power source internal impedance Z0 and the wiring impedance Z1 (FIG. 2).

Now, with reference to FIG. 9A, FIG. 9B, FIG. 10A, and FIG. 10B, time waveforms in the case of occurrence of fluctuation in the input voltage V1 are described through comparison between the related art and the present invention.

FIG. 9A and FIG. 10A are time waveform graphs of the output voltage, the reactor current, and the input voltage in the related-art DC/DC converter device. FIG. 9A is a graph for showing a case in which the output voltage command value V2ref changes so as to rise stepwise, and FIG. 10A is a graph for showing a case in which the output voltage command value V2ref changes so as to fall stepwise.

Meanwhile, FIG. 9B and FIG. 10B are time waveform graphs of the output voltage, the reactor current, and the input voltage in the DC/DC converter device according to the first embodiment of the present invention. FIG. 9B is a graph for showing a case in which the output voltage command value V2ref changes so as to rise stepwise, and FIG. 10B is a graph for showing a case in which the output voltage command value V2ref changes so as to fall stepwise.

In the related-art DC/DC converter device, the rate-of-change limiting value for the output voltage target value is set to a fixed value, or set without being associated with the input voltage (FIG. 9A and FIG. 10A).

In contrast, as described with reference to FIG. 5 and FIG. 6, the DC/DC converter device of the present invention has the function of setting the rate-of-change limiting value for the output voltage target value in accordance with the magnitude of the input voltage (FIG. 9B and FIG. 10B).

First, for comparison with the present invention, the output voltage waveform of the related-art DC/DC converter device is described with reference to FIG. 9A.

In FIG. 9A, the output voltage command value V2ref changes so as to rise stepwise at the time t1. Subsequently, from the time t1 to t2, the converter control unit increases the reactor current IL such that the output voltage V2 matches with the output voltage target value V2ref*.

With increase in the reactor current IL, a voltage drop due to the wiring impedance Z1 (6) and the power source internal impedance Z0 (402) increases, and the input voltage V1 thus decreases.

Subsequently, from the time t2 to t3, the converter control unit decreases the reactor current IL such that the output voltage V2 matches with the output voltage target value V2ref* (708 of FIG. 9A). With decrease in the reactor current IL, the voltage drop due to the wiring impedance Z1 (6) and the power source internal impedance Z0 (402) decreases, and the input voltage V1 thus increases (709 of FIG. 9A).

An amount of increase in the output voltage V2 depends on a value obtained by multiplying an amount of increase in the input voltage V1 by a ratio of step-up of the input voltage V1 by the DC/DC converter. Therefore, at the time t3, as a result of increasing the input voltage V1 (709 of FIG. 9A), overshooting occurs in the output voltage V2 (707 of FIG. 9A).

Next, the time waveforms in the case of applying the DC/DC converter device of the present invention are described. FIG. 9B and FIG. 10B are time waveform graphs of the output voltage, the reactor current, and the input voltage in the DC/DC converter device according to the first embodiment of the present invention. FIG. 9B is a graph for showing a case in which the output voltage command value V2ref changes so as to rise stepwise, and FIG. 10B is a graph for showing a case in which the output voltage command value V2ref changes so as to fall stepwise.

The time waveforms in the case of applying the DC/DC converter device of the present invention are described with reference to FIG. 9B. In FIG. 9B, the output voltage, the reactor current, and the input voltage of FIG. 9A are shown by dotted lines for the sake of comparison.

In FIG. 9B, the output voltage command value V2ref changes stepwise at the time t1. Subsequently, from the time t1 to t3, the converter control unit 320 increases the reactor current IL such that the output voltage V2 matches with the output voltage target value V2ref*. The reactor current IL increases, and the voltage drop occurs due to the wiring impedance Z1 (6) and the power source internal impedance Z0 (402). Thus, the input voltage V1 decreases.

Differently from the related-art DC/DC converter device described with reference to FIG. 9A, the DC/DC converter device of the present invention in FIG. 9B includes the converter control unit 320 configured to set the rate-of-change limiting value for the output voltage target value in accordance with the magnitude of the input voltage to generate the output voltage target value V2ref*.

Specifically, at the time t2 of FIG. 9B, the input voltage V1 becomes equal to or smaller than the threshold value a1 by virtue of an increase in the voltage drop due to the wiring impedance Z1 (6) and the power source internal impedance Z0 (402). As described with reference to FIG. 5 and FIG. 6, in response to the input voltage V1 becoming equal to or smaller than the threshold value a1, the converter control unit 320 adopts the set value b2 smaller than the set value b1 as the upper limit value of the rate-of-change limiting value for the output voltage target value V2ref*.

This leads to a decrease in the amount of increase in the reactor current that started increasing at the time t1 (an arrow 710 of FIG. 9B), as compared with the case of the related-art converter device (FIG. 9A). As a result, an amount of decrease in the input voltage V1 also decreases (an arrow 711 of FIG. 9B).

Subsequently, at the time t3, the converter control unit 320 lowers the reactor current such that the output voltage V2 matches with the output voltage target value V2ref* (713 of FIG. 9).

With decrease in the reactor current IL, the amount of the voltage drop due to the power source internal impedance Z0 (402) and the wiring impedance Z1 (6) decreases, and the input voltage V1 thus increases (714 of FIG. 9B).

However, the amount of decrease in the reactor current decreases as compared with the case of the related-art converter device (FIG. 9A). Therefore, the amount of increase in the input voltage V1 also decreases. As a result, it is possible to make the overshooting of the output voltage V2 smaller than that in the related-art converter device (712 of FIG. 9B).

Next, with reference to FIG. 10A and FIG. 10B, there is described a case in which the output voltage command value V2ref changes so as to fall stepwise. FIG. 10A is an example of the case of applying the related-art DC/DC converter, and FIG. 10B is an example of the case of applying the DC/DC converter of the present invention.

In FIG. 10A, the output voltage command value V2ref changes so as to fall stepwise at the time t1. From the time t1 to t3, the converter control unit decreases the reactor current IL such that the output voltage V2 matches with the output voltage target value V2ref* (716 of FIG. 10A). With decrease in the reactor current IL, the voltage drop due to the wiring impedance Z1 (6) and the power source internal impedance Z0 (402) decreases, and the input voltage V1 thus increases (717 of FIG. 10A).

Next, the time waveforms in the case of applying the DC/DC converter of the present invention are described with reference to FIG. 10B. In FIG. 10B, the output voltage, the reactor current, and the input voltage of FIG. 10A are shown by dotted lines for the sake of comparison.

In FIG. 10B, the output voltage command value V2ref changes so as to fall stepwise at the time t1. Subsequently, from the time t1 to t3, the converter control unit 320 decreases the reactor current IL such that the output voltage V2 matches with the output voltage target value V2ref*. The reactor current IL decreases, and the voltage drop occurs due to the wiring impedance Z1 (6) and the power source internal impedance Z0 (402). Thus, the input voltage V1 increases.

Differently from the related-art DC/DC converter device described with reference to FIG. 10A, the DC/DC converter device of the present invention in FIG. 10B includes the converter control unit 320 configured to set the rate-of-change limiting value for the output voltage target value in accordance with the magnitude of the input voltage to generate the output voltage target value V2ref*.

Specifically, at the time t2 of FIG. 10B, the input voltage V1 becomes equal to or larger than the threshold value a2 by virtue of a decrease in the voltage drop due to the wiring impedance Z1 (6) and the power source internal impedance Z0 (402). As described with reference to FIG. 5 and FIG. 6, in response to the input voltage V1 becoming equal to or larger than the threshold value a2, the converter control unit 320 adopts the set value −b3 larger than the set value −b4 as the lower limit value of the rate-of-change limiting value for the output voltage target value V2ref*.

This leads to a decrease in the amount of decrease in the reactor current that started decreasing at the time t1 (an arrow 721 of FIG. 10B), as compared with the case of the related-art converter device (FIG. 10A). As a result, an amount of increase in the input voltage V1 also decreases (an arrow 722 of FIG. 10B).

As described above, in response to the input voltage V1 becoming equal to or larger than the threshold value a2, the converter control unit 320 in the first embodiment changes the lower limit value of the rate-of-change limiting value for the output voltage target value V2ref* from the set value −b4 to the set value −b3, thereby reducing the amount of increase in the input voltage V1.

The method of changing the upper limit value and the lower limit value of the rate-of-change limiting value for the output voltage target value in accordance with the magnitude of the input voltage is not limited to the method illustrated in FIG. 5 and shown in FIG. 6. There may be used a method in which the upper limit value and the lower limit value of the rate-of-change limiting value for the output voltage target value are limited by a primary delay filter and a time constant of the filter is set in accordance with the detected input voltage value V1s.

Alternatively, the upper limit value and the lower limit value of the rate-of-change limiting value for the output voltage target value may be set based on the detected input voltage value V1s and the output voltage command value V2ref or based on the detected input voltage value V1s and the detected output voltage value V2s.

According to the first embodiment of the present invention described above, effects as below are obtained.

(Effect 1)

The control unit of the first embodiment has a configuration to change the lower limit value of the rate of change in the output voltage target value V2ref* in such a direction as to raise the lower limit value, that is, in such a direction as to reduce the lower limit width, when the detected input voltage value V1s is a value equal to or larger than the predetermined value (V1s≥threshold value a2).

It is thereby possible to reduce the amount of increase in the input voltage V1. In other words, it is possible to increase a margin for a rated voltage concerning the input-side smoothing capacitor and the power source. Consequently, it is possible to improve voltage endurance and durability of the DC/DC converter device. Further, it is possible to lower the capacitance of the input-side smoothing capacitor, to thereby achieve reduction in size and cost of the DC/DC converter device.

(Effect 2)

The control unit of the first embodiment has a configuration to change the upper limit value of the rate of change in the output voltage target value V2ref* in such a direction as to lower the upper limit value, that is, in such a direction as to reduce the upper limit width, when the detected input voltage value V1s is a value equal to or smaller than the predetermined value (V1s≤threshold value a1).

It is thereby possible to suppress the overshooting of the output voltage V2. In other words, it is possible to increase the margin for the rated voltage concerning the output-side smoothing capacitor and the load. Consequently, it is possible to improve the voltage endurance and the durability of the DC/DC converter device. Further, it is possible to lower the capacitance of the output-side smoothing capacitor, to thereby achieve reduction in size and cost of the DC/DC converter device.

(Effect 3)

It may be desired that the time taken until matching of the output voltage V2 is achieved with respect to the change in the output voltage command value V2ref be short, that is, the property of the output voltage V2 to follow the output voltage command value V2ref be high. In this case, when the power source internal impedance increases due to temperature characteristics, time degradation, variation in performance, and the like of the power source, the input voltage V1 is apt to decrease or increase in accordance with the direction of the current. As a result, it is difficult to ensure the property of the output voltage V2 to follow the change of the output voltage command value V2ref.

In contrast, the control unit of the first embodiment has a configuration in which, in a specific range of the detected input voltage value V1s, a rate-of-change limiting range is narrowed by lowering the upper limit value of the rate-of-change limiting value or raising the lower limit value thereof. As a result, it is possible to improve the property of the output voltage V2 to follow the output voltage command value V2ref in the range in which the rate-of-change limiting range is not narrowed.

In summary, the control unit of the first embodiment achieves Effect 1 and Effect 2 by narrowing the rate-of-change limiting range in the range of the detected input voltage value V1s being equal to or smaller than the threshold value a1 or equal to or larger than the threshold value a2, and achieves Effect 3 by not narrowing the rate-of-change limiting range in the range of the detected input voltage value V1s being larger than the threshold value a1 or smaller than the threshold value a2.

Second Embodiment

In the above-mentioned first embodiment, there has been described the case in which the rate-of-change limiting value for the output voltage target value is variably set by taking the detected input voltage value V1s as the index value for quantitatively evaluating the amount of fluctuation in the input voltage V1. In contrast, in a second embodiment of the present invention described below, there is described a case in which the rate-of-change limiting value for the output voltage target value is variably set by taking the amount of the voltage drop on the input side as the above-mentioned index value. In the following, description of portions overlapping those in the first embodiment is omitted. Further, in the following, a voltage drop amount or a voltage drop value is described as being referred to as a voltage drop.

An input-side voltage drop V1drop can be calculated from the detected power source output terminal voltage value Vbs and the detected input voltage value V1s as shown in Expression (1) below:

$$V1drop = Vbs - V1s \qquad (1)$$

As in the first embodiment, the detected input voltage value V1s is output to the converter control unit 320 by the voltage sensor 203 inside the DC/DC converter 100. The detected power source output terminal voltage value Vbs may be directly output to the converter control unit 320 by the voltage sensor 204, or may be output to the converter control unit 320 via the host control unit 310. A CPU (not shown) in the converter control unit 320 calculates the input-side voltage drop V1drop based on Expression (1) and outputs the calculated result to the voltage target value setting unit 311.

FIG. 11 is a flowchart for illustrating processing of setting the rate-of-change limiting value for the output voltage target value in the rate-of-change limiting value setting unit 331 of the second embodiment of the present invention. FIG. 12 is an explanatory graph for showing the relationship of threshold values c1 and c2 of the input voltage drop and the set values b1, b2, −b3, and −b4 of the rate-of-change limiting value for the output voltage target value illustrated in the flowchart of FIG. 11 in the second embodiment of the present invention. In this context, the threshold values are in the relationship of c1>c2, and the set values are in the relationship of b1>b2>−b3>−b4.

In the second embodiment, the rate-of-change limiting value setting unit 331 stores, in a storage unit (not shown) in advance, a plurality of threshold values of the input-side voltage drop V1drop obtained from Expression (1) and set values for a plurality of rate-of-change limiting values associated with the plurality of threshold values.

Next, the operation of setting the rate-of-change limiting value for the output voltage command value V2ref in the second embodiment is described in detail with reference to FIG. 11 and FIG. 12.

In Step S1101 of FIG. 11, the rate-of-change limiting value setting unit 331 in the voltage target value setting unit 321 determines whether the input-side voltage drop V1drop is equal to or smaller than the threshold value c1. When determining that the input-side voltage drop V1drop is equal to or smaller than the threshold value c1 (V1drop≤threshold value c1: YES), the rate-of-change limiting value setting unit 331 proceeds to Step S1102, and sets the upper limit value of the rate-of-change limiting value to the set value b1, and the lower limit value thereof to the set value −b3.

Further, when determining that the input-side voltage drop V1drop is larger than the threshold value c1 (V1drop≤threshold value c1: NO) in Step S1101, the rate-of-change limiting value setting unit 331 proceeds to Step S1103, and determines whether the input-side voltage drop V1drop is equal to or larger than the threshold value c2. When determining that the input-side voltage drop V1drop is equal to or larger than the threshold value c2 (V1drop≥threshold value c2: YES), the rate-of-change limiting value setting unit 331 proceeds to Step S1104, and sets the upper limit value of the rate-of-change limiting value to the set value b2, and the lower limit value thereof to the set value −b4.

When determining that the input-side voltage drop V1drop is larger than the threshold value c1 (V1drop≤threshold value c1: NO) and smaller than the threshold value c2 (V1drop≥threshold value c2: NO), the rate-of-change limiting value setting unit 331 proceeds to Step S1105, and sets the upper limit value of the rate-of-change limiting value to the set value b1, and the lower limit value thereof to the set value −b4.

The rate-of-change limiting value setting unit 331 outputs the set upper limit value and lower limit value of the rate-of-change limiting value to the rate-of-change limiting unit 330. The rate-of-change limiting unit 330 applies the set upper limit value and lower limit value of the rate-of-change limiting value to the calculated output voltage target value V2ref* to limit the output voltage target value V2ref*, and outputs the limited output voltage target value V2ref* as output of the voltage target value setting unit 321 to the voltage control Duty calculation unit 322.

FIG. 12 is a summary of the above-mentioned processing results. As shown in FIG. 12, when the input-side voltage drop V1drop is a value equal to or smaller than the predetermined value (V1drop≤threshold value c1), the voltage target value setting unit 321 changes the lower limit value of the rate of change in the output voltage command value V2ref and the output voltage target value V2ref* in such a direction as to raise the lower limit value, that is, in such a direction as to reduce the lower limit width. It is thereby possible to reduce the amount of increase in the input voltage V1.

When the input-side voltage drop V1drop is a value equal to or larger than the predetermined value (V1drop≥threshold value c2), the voltage target value setting unit 321 changes the upper limit value of the rate of change in the output voltage target value V2ref* in such a direction as to lower the upper limit value, that is, in such a direction as to reduce the upper limit width. It is thereby possible to reduce the overshooting of the output voltage V2.

Figure 13:
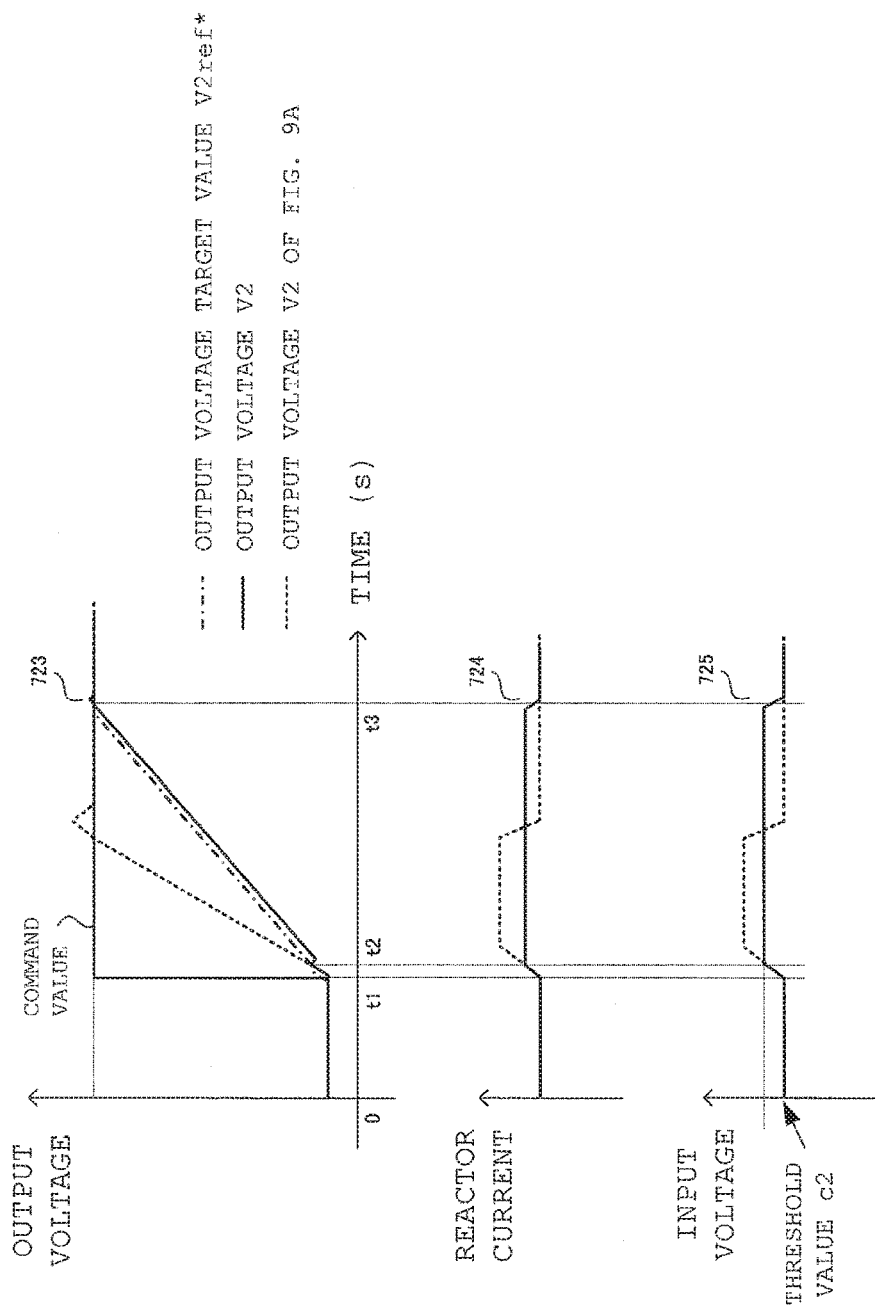
FIG. 13 is a graph for showing time waveforms of an output voltage, a reactor current, and an input voltage drop when an output voltage command value rises stepwise in the second embodiment of the present invention.
Figure 14:
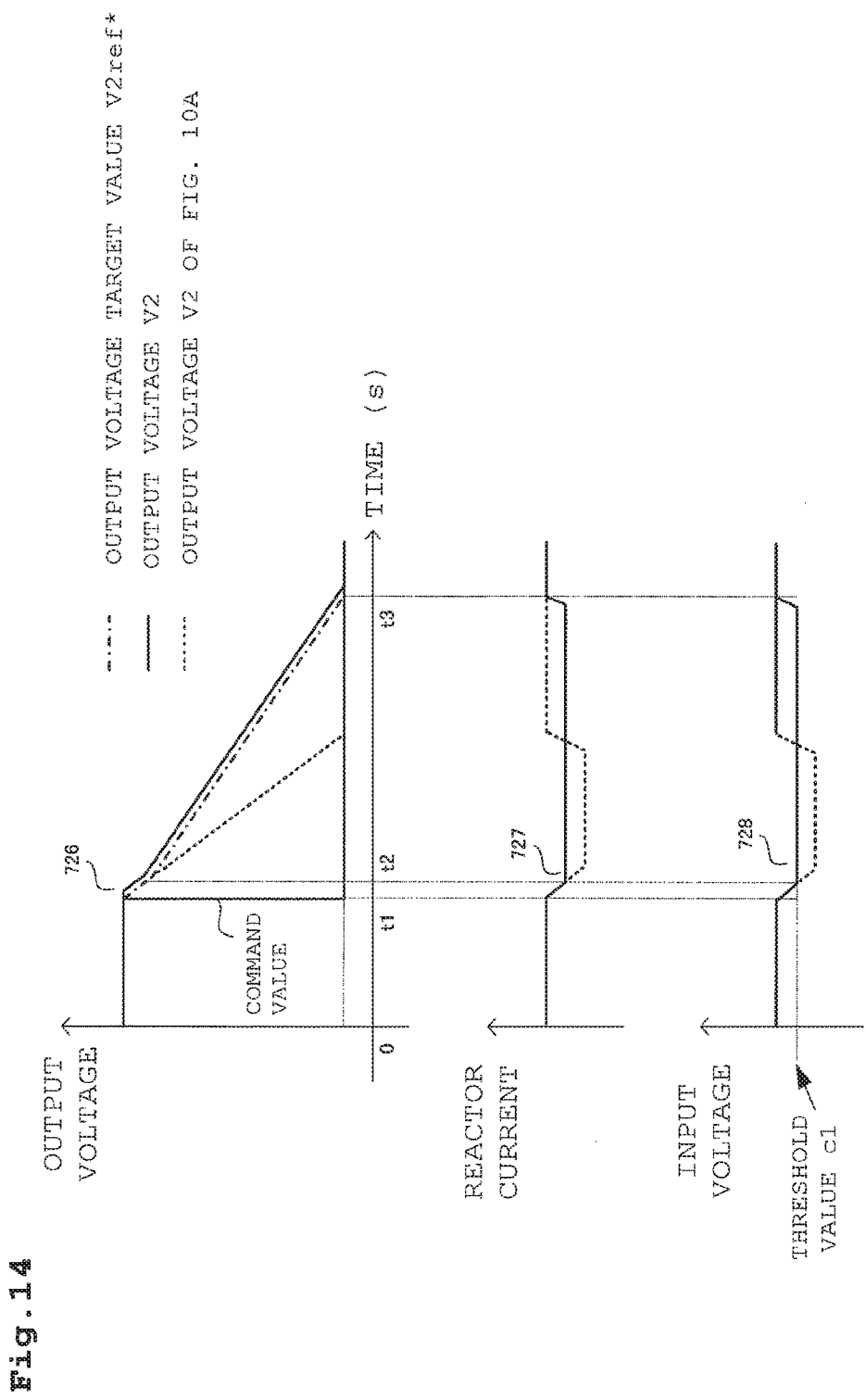
FIG. 14 is a graph for showing time waveforms of the output voltage, the reactor current, and the input voltage drop when the output voltage command value falls stepwise in the second embodiment of the present invention.

Next, the output voltage waveforms of the DC/DC converter device according to the second embodiment of the present invention are described. FIG. 13 and FIG. 14 are time waveform graphs of the output voltage, the reactor current, and the input voltage drop in the DC/DC converter device according to the second embodiment of the present invention. FIG. 13 is a graph for showing a case in which the output voltage command value V2ref changes so as to rise stepwise, and FIG. 14 is a graph for showing a case in which the output voltage command value V2ref changes so as to fall stepwise.

As shown in FIG. 13 and FIG. 14, the output voltage waveform and the reactor current waveform in the second embodiment are similar to those in FIG. 9B and FIG. 10B in the above-mentioned first embodiment.

FIG. 13 in the second embodiment for showing the case of the output voltage command value V2ref changing so as to rise stepwise differs from FIG. 9B in the above-mentioned first embodiment in two respects below.

(Difference 1)

In FIG. 13, the waveform of the "input voltage drop" is shown in place of the waveform of the "input voltage" in FIG. 9B.

(Difference 2)

In FIG. 13, at the time t2, the upper limit value of the rate of change in the output voltage is changed from the set value b1 to the set value b2 with the input-side voltage drop V1drop becoming equal to or larger than the threshold value c2.

Similarly, FIG. 14 in the second embodiment for showing the case of the output voltage command value V2ref changing so as to fall stepwise differs from FIG. 10B in the above-mentioned first embodiment in two respects below.

(Difference 1)

In FIG. 14, the waveform of the "input voltage drop" is shown in place of the waveform of the "input voltage" in FIG. 10B.

(Difference 2)

In FIG. 14, at the time t2, the lower limit value of the rate of change in the output voltage is changed from the set value −b4 to the set value −b3 with the input-side voltage drop V1drop becoming equal to or smaller than the threshold value c1.

The method of changing the upper limit value and the lower limit value of the rate-of-change limiting value for the output voltage target value in accordance with the magnitude of the input-side voltage drop is not limited to the method illustrated in FIG. 11 and shown in FIG. 12. There may be used a method in which the upper limit value and the lower limit value of the rate-of-change limiting value for the output voltage target value are limited by a primary delay filter and the time constant of the filter is set in accordance with the input-side voltage drop V1drop.

Alternatively, the upper limit value and the lower limit value of the rate-of-change limiting value for the output voltage target value may be set based on the input-side voltage drop V1drop and the output voltage command value V2ref, or based on the input-side voltage drop V1drop and the detected output voltage value V2s.

Further, the input-side voltage drop V1drop is not limited to that calculated by Expression (1) above. As described below, the input-side voltage drop V1drop can also be calculated by using a value obtained by applying a low-pass filter to the detected input voltage value V1s.

Figure 15:
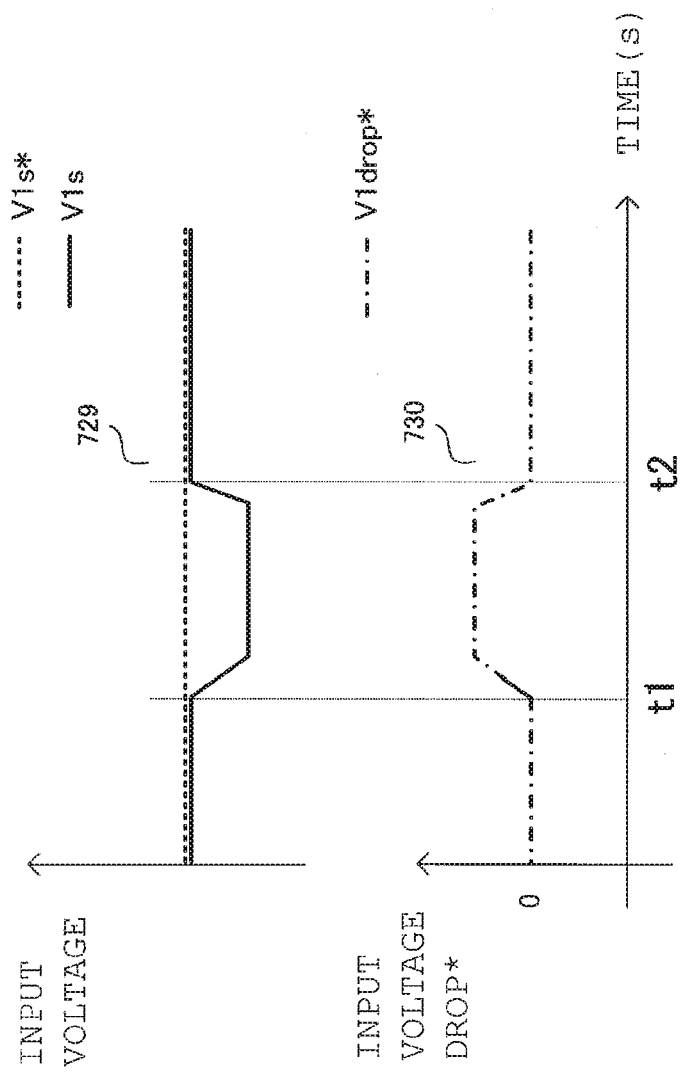
FIG. 15 is a graph for showing time waveforms of a detected input voltage value and a value obtained by applying a filter to the detected input voltage value in the second embodiment of the second embodiment.

In FIG. 15, the respective waveforms of the detected input voltage value V1s and a filtered detected input voltage value V1s*, which is obtained by applying the low-pass filter to the detected input voltage value V1s at the time of change in the input voltage, are shown as the "input voltage" in the upper level. A waveform of the input-side voltage drop* (V1drop*) calculated based on Expression (2) shown below is shown in the lower level.

$$V1drop* = V1s* - V1s \qquad (2)$$

In place of the input-side voltage drop V1drop obtained by Expression (1), the input-side voltage drop* (V1drop*) calculated using Expression (2) can be used as the index value. That is, in the description of the second embodiment and in FIG. 11 to FIG. 14 as well as in modification examples of the first and second embodiments described below, the input-side voltage drop* (V1drop*) may be used in place of the input voltage drop (V1drop).

When the input-side voltage drop* (V1drop*) obtained by Expression (2) is used, the detection circuit and the function for detecting the detected power source output terminal voltage value Vbs shown in Expression (1) become unnecessary. As a result, the use of the input-side voltage drop* (V1drop*) calculated by Expression (2) brings an advantage in that the cost and the number of parts of the DC/DC converter device can be reduced.

Although the low-pass filter has been applied as the filter in the above description, another filter, for example, a bypass filter, may be used to achieve the equivalent function.

In place of the input voltage drop (V1drop), a detected reactor current value ILs may be used as the index value. A value corresponding to the input-side voltage drop V1drop can be derived from the reactor current IL, the power source internal impedance Z0, and the wiring impedance Z1. In this case, the power source internal impedance Z0 and the wiring impedance Z1 can be used as fixed values in calculation. Therefore, the detected reactor current value ILs can be used in place of the input voltage drop V1drop.

In each of the first embodiment and the second embodiment, there has been described the example in which the detected input voltage value V1s, the input-side voltage drop V1drop, the input-side voltage drop* (V1drop*), or the detected reactor current value ILs is separately used as the index value to set the rate-of-change limiting value for the output voltage target value. However, in the present invention, those values may not be used alone, but two or more index values may be used in combination as necessary to improve the accuracy in the setting of the rate-of-change limiting value.

In addition, the control unit 300 may be provided with, for example, such a function as to allow a user to select which detected value or which numeric value is to be used as the index value out of the values described above in accordance with the type of the load 5, the usage conditions of the DC/DC converter 100, and the like.

According to the second embodiment described above, effects as below are obtained similarly to the first embodiment.

(Effect 1)

By raising the rate-of-change lower limit value when the input-side voltage drop V1drop is small, the amount of increase in the input voltage V1 can be reduced. In other words, it is possible to increase the margin for the rated voltage concerning the input-side smoothing capacitor and the power source. Consequently, it is possible to improve the voltage endurance and the durability of the DC/DC converter device. Further, it is possible to lower the capacitance of the input-side smoothing capacitor, to thereby achieve reduction in size and cost of the DC/DC converter device.

(Effect 2)

By lowering the rate-of-change upper limit value when the input-side voltage drop V1drop is large, the overshooting of the output voltage V2 can be suppressed. In other words, it is possible to increase the margin for the rated voltage concerning the output-side smoothing capacitor and the load. Consequently, it is possible to improve the voltage endurance and the durability of the DC/DC converter device. Further, it is possible to lower the capacitance of the output-side smoothing capacitor, to thereby achieve reduction in size and cost of the DC/DC converter device.

(Effect 3)

The DC/DC converter device has a configuration in which, in the specific range of the input-side voltage drop V1drop or the reactor current IL, the rate-of-change limiting range is narrowed by lowering the upper limit value of the rate-of-change limiting value or raising the lower limit value thereof. As a result, it is possible to improve the property of the output voltage V2 to follow the output voltage command value V2ref in the range in which the rate-of-change limiting range is not narrowed.

Third Embodiment

A third embodiment of the present invention is a modification example of the above-mentioned first embodiment. More specifically, a DC/DC converter device according to the third embodiment has the configuration of changing the rate-of-change upper limit value and the rate-of-change lower limit value in a multistep manner or continuously in accordance with the magnitude of the detected input voltage value.

Figure 16:
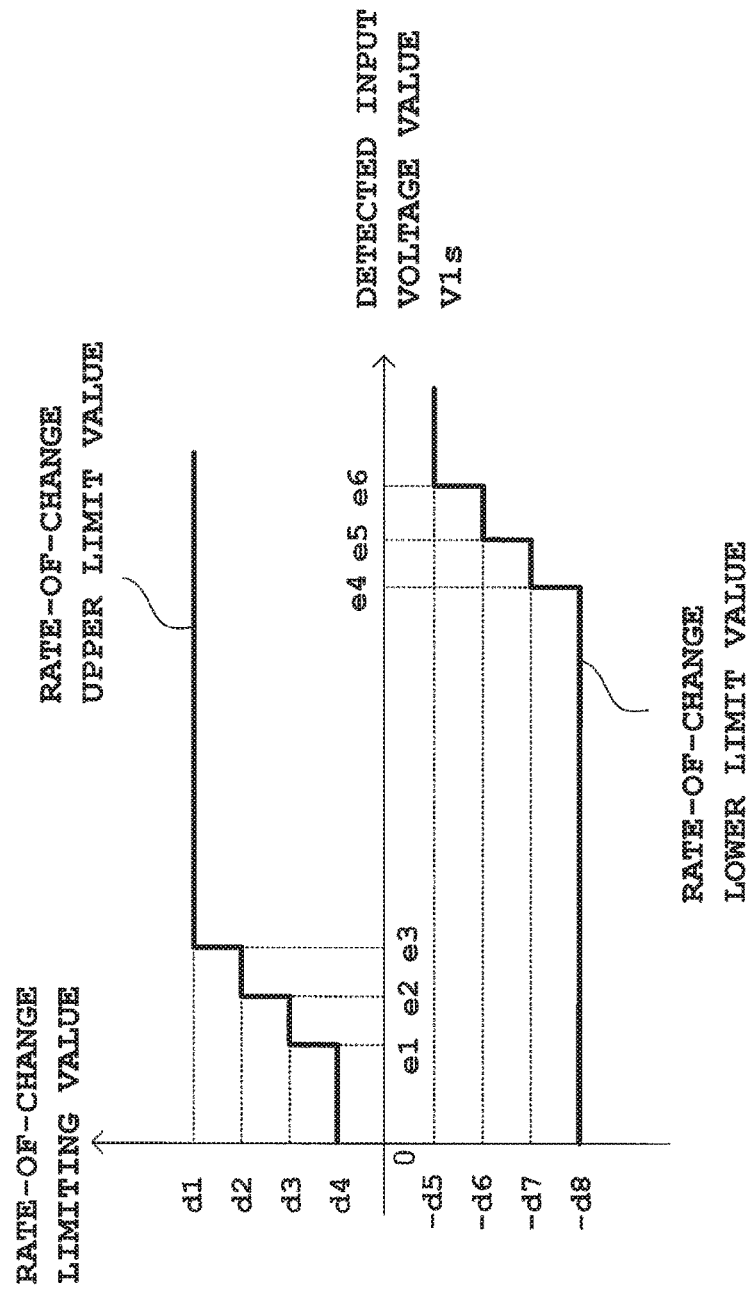
FIG. 16 is a graph for showing a setting of a rate-of-change limiting value for an output voltage target value with respect to a detected input voltage value in a third embodiment of the present invention.
Figure 17:
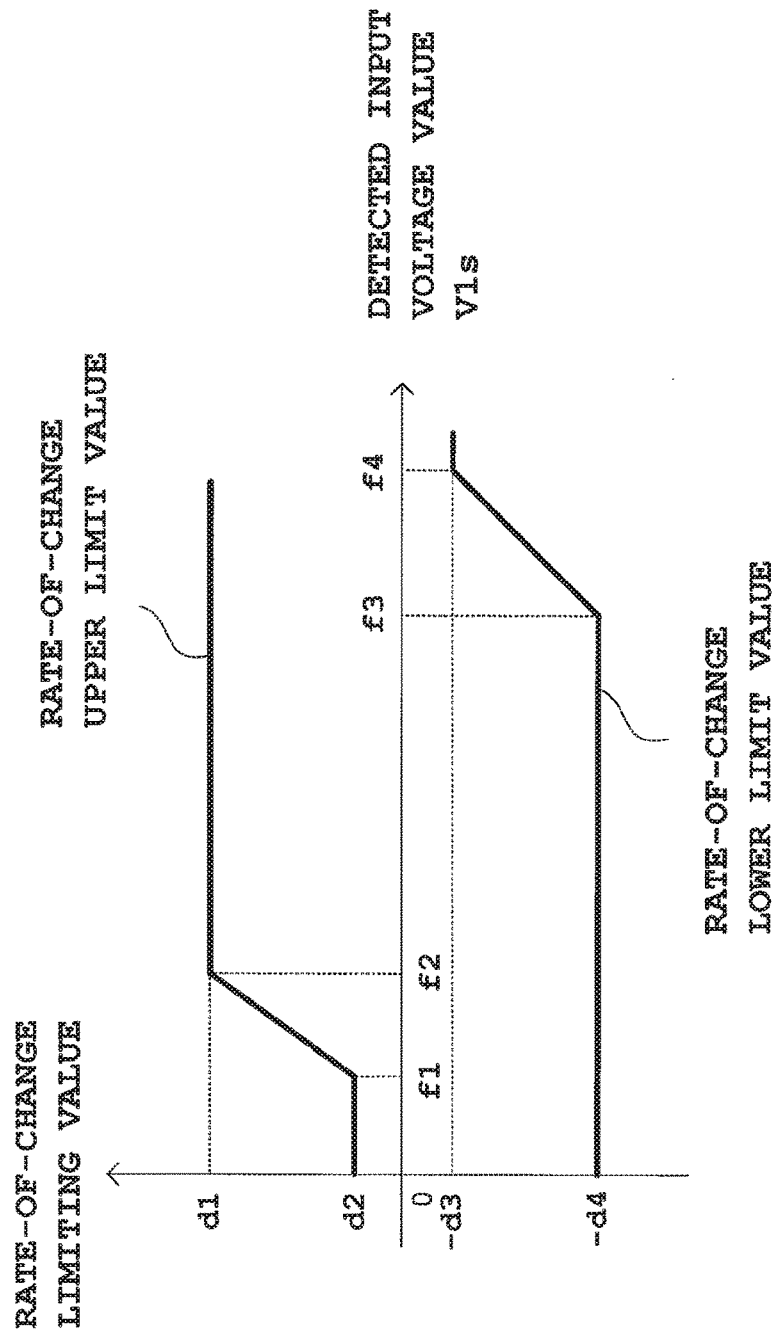
FIG. 17 is a graph for showing a setting of the rate-of-change limiting value for the output voltage target value with respect to the detected input voltage value in the third embodiment of the present invention.

FIG. 16 and FIG. 17 are graphs for showing a modification example concerning the method of setting the threshold value of the detected input voltage value and the rate-of-change limiting value for the output voltage target value, which are described with reference to FIG. 6 of the above-mentioned first embodiment.

In FIG. 16, there is shown a case in which the threshold value of the detected input voltage value V1s is set to six values in total, which are e1 to e6. Further, there is shown a case in which the upper limit value and the lower limit value of the rate-of-change limiting value are set by the voltage target value setting unit 321 to eight steps in total, which are d1, d2, d3, d4, −d5, −d6, −d7, and −d8.

In this context, the threshold values are in the relationship of e6>e5>e4>e3>e2>e1, and the set values of the upper limit value and the lower limit value of the rate-of-change limiting value are in the relationship of d1>d2>d3>d4>−d5>−d6>−d7>−d8. When the set numbers of threshold values and rate-of-change limiting values are increased in this manner, it is possible to more accurately set the rate-of-change limiting value in accordance with the magnitude of the detected input voltage value.

Further, when the set numbers are increased, the amount of change in the rate-of-change limiting value for each threshold value with respect to the detected input voltage value V1s is reduced. Therefore, it is possible to reduce the overshooting of the output voltage due to a sudden change in the rate of change.

The set numbers of threshold values and rate-of-change limiting values are not limited to the set numbers shown in FIG. 16. The set numbers of threshold values and rate-of-change limiting values may further be increased as necessary. Further, in FIG. 16, each interval between threshold values is equivalent except for an interval between the threshold values e3 and e4, but those intervals are not necessarily required to be equivalent. A plurality of threshold values and set values may be provided at a plurality of intervals as necessary.

FIG. 17 is an example of a case in which the rate-of-change limiting value is set so as not to change stepwise as in FIG. 6 and FIG. 16, but to change continuously with respect to the detected input voltage value V1s. In FIG. 17, there is shown a case of having the upper limit value and the lower limit value of the rate-of-change limiting value that have fixed values with respect to a predetermined changing range of the detected input voltage value V1s, and the upper limit value and the lower limit value of the rate-of-change limiting value that are set so as to change continuously with respect to the change in the detected input voltage value V1s.

More specifically, in FIG. 17, there is shown a case in which the threshold value of the detected input voltage value V1s is set to four values in total, which are f1, f2, f3, and f4, and the upper limit value and the lower limit value of the rate-of-change limiting value are set to four steps in total, which are d1, d2, −d3, and −d4. In this context, the threshold values are in the relationship of f4>f3>f2>f1, and the set values of the upper limit value and the lower limit value of the rate-of-change limiting value are in the relationship of d1>d2>−d3>−d4.

In FIG. 17, the upper limit value of the rate-of-change limiting value is set to d2 when the threshold value is equal to or smaller than f1, and is set to d1 when the threshold value is equal to or larger than f2. On the other hand, when the threshold value is larger than f1 and smaller than f2, the upper limit value of the rate-of-change limiting value is set so as to continuously change between d2 and d1 with respect to the change in the detected input voltage value V1s.

Similarly, the lower limit value of the rate-of-change limiting value is set to −d4 when the threshold value is equal to or smaller than f3, and is set to −d3 when the threshold value is equal to or larger than f4. On the other hand, when the threshold value is larger than f3 and smaller than f4, the lower limit value of the rate-of-change limiting value is set so as to continuously change between −d4 and −d3 with respect to the change in the detected input voltage value V1s.

By continuously changing the rate-of-change limiting value as above instead of changing the rate-of-change limiting value stepwise (discontinuously) as in FIG. 6 and FIG. 16, it is possible to more accurately control the rate-of-change limiting value in accordance with the magnitude of the detected input voltage value. This continuous change is not limited to a linear change as shown in FIG. 17, but may be a continuous change by a monotonic increase or a monotonic decrease, for example, transition made by using characteristics of an exponential function or a logarithmic function.

Fourth Embodiment

A fourth embodiment of the present invention is a modification example of the above-mentioned second embodiment. More specifically, a DC/DC converter device according to the fourth embodiment has the configuration of changing the rate-of-change upper limit value and the rate-of-change lower limit value in a multistep manner or continuously in accordance with the magnitude of the input voltage drop.

Figure 18:
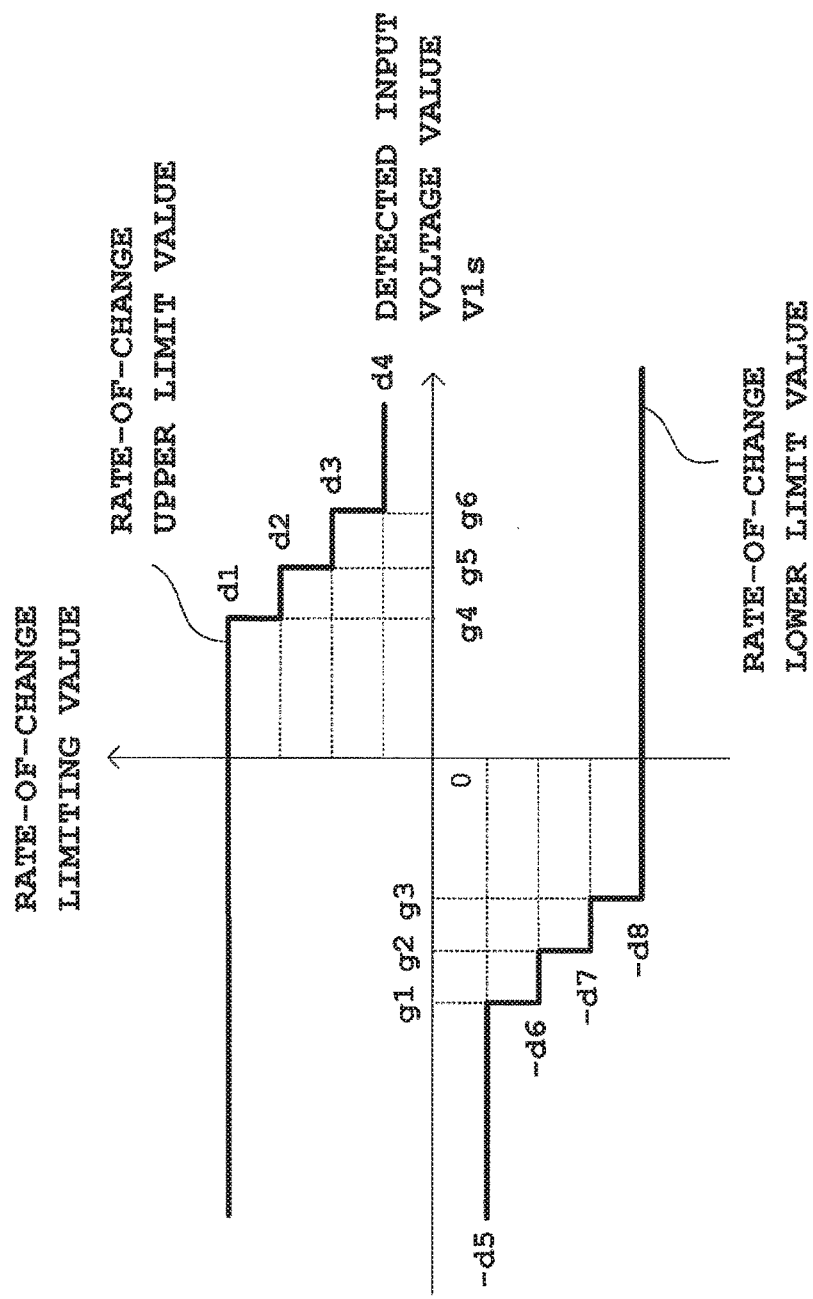
FIG. 18 is a graph for showing a setting of a rate-of-change limiting value for an output voltage target value with respect to an input-side voltage drop in a fourth embodiment of the present invention.
Figure 19:
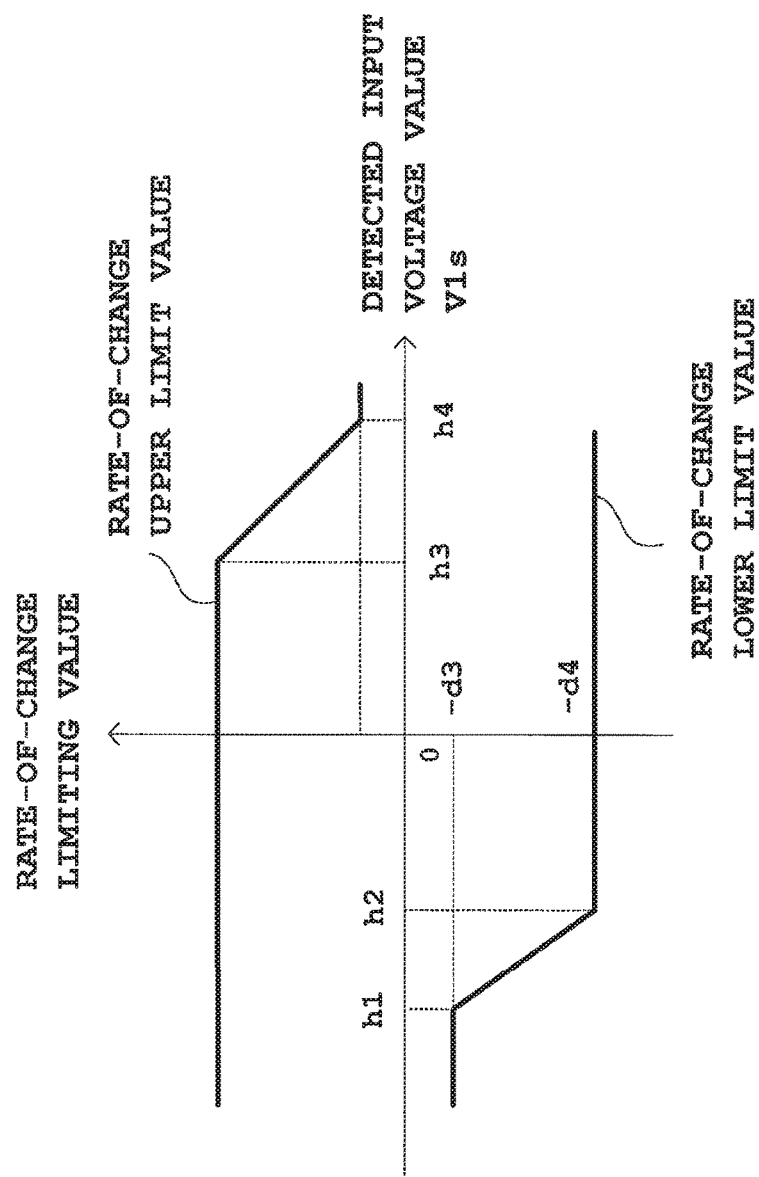
FIG. 19 is a graph for showing a setting of the rate-of-change limiting value for the output voltage target value with respect to the input-side voltage drop in the fourth embodiment of the present invention.

FIG. 18 and FIG. 19 are graphs for showing a modification example concerning the method of setting the threshold value of the input voltage drop and the rate-of-change limiting value for the output voltage target value, which are described with reference to FIG. 12 of the above-mentioned second embodiment.

Similarly to FIG. 16, in FIG. 18, there is shown an example of increasing the set numbers of rate-of-change limiting values and threshold values of the input-side voltage drop V1drop, and a similar effect to that of FIG. 16 can be obtained. Specifically, in FIG. 18, there is shown a case in which the threshold value of the detected input voltage value V1s is set to six values in total, which are g1 to g6, and the upper limit value and the lower limit value of the rate-of-change limiting value are set to eight steps in total, which are d1, d2, d3, d4, −d5, −d6, −d7, and −d8.

In this context, the threshold values are in the relationship of g6>g5>g4>g3>g2>g1, and the set values of the upper limit value and the lower limit value of the rate-of-change limiting value are in the relationship of d1>d2>d3>d4>−d5>−d6>−d7>−d8. When the set numbers of threshold values and rate-of-change limiting values are increased in this manner, it is possible to more accurately set the rate-of-change limiting value in accordance with the magnitude of the input-side voltage drop.

Similarly to FIG. 17, in FIG. 19, there is shown an example of the case of having the upper limit value and the lower limit value of the rate-of-change limiting value that are set so as to continuously change with respect to the change in the input-side voltage drop (V1drop) in a predetermined range, and it is possible to obtain a similar effect to that of FIG. 17.

Specifically, in FIG. 19, there is shown a case in which the threshold value of the detected input voltage value V1s is set to four values in total, which are h1, h2, h3, and h4, and the upper limit value and the lower limit value of the rate-of-change limiting value are set to four steps in total, which are d1, d2, −d3, and −d4. In this context, the threshold values are in the relationship of h4>h3>h2>h1, and the set values of the upper limit value and the lower limit value of the rate-of-change limiting value are in the relationship of d1>d2>−d3>−d4. By continuously changing the rate-of-change limiting value as above, it is possible to more accurately control the rate-of-change limiting value in accordance with the magnitude of the input-side voltage drop.

What is claimed is:

1. A DC/DC converter device, comprising:
   a DC/DC converter including a power conversion unit configured to step up or step down an input voltage supplied from a DC power source to output an output voltage, and a reactor connected between the power conversion unit and the DC power source; and
   a control unit configured to generate an output voltage target value in accordance with an output voltage command value to control the power conversion unit such that the output voltage follows the output voltage target value,
   wherein the control unit includes a rate-of-change limiting value setting unit configured to set a rate-of-change limiting value for the output voltage target value, and is configured to limit the output voltage command value by using the rate-of-change limiting value, to thereby generate the output voltage target value, and
   wherein the rate-of-change limiting value setting unit is configured to obtain an index value for quantitatively evaluating an amount of fluctuation in the input voltage supplied to the DC/DC converter, to thereby change a setting of the rate-of-change limiting value in such a direction as to narrow a rate-of-change limiting range when the index value is within a predetermined specific range.

2. A DC/DC converter device according to claim 1, wherein, when the setting is changed from a rate-of-change limiting value before a change to a rate-of-change limiting value after the change, the rate-of-change limiting value setting unit changes the rate-of-change limiting value stepwise in at least two steps to change the setting.

3. A DC/DC converter device according to claim 1, wherein, when the setting is changed from a rate-of-change limiting value before a change to a rate-of-change limiting value after the change, the rate-of-change limiting value setting unit monotonously increases or monotonously decreases the rate-of-change limiting value continuously to change the setting.

4. A DC/DC converter device according to claim 1, wherein, when the setting is changed from a rate-of-change limiting value before a change to a rate-of-change limiting value after the change, the rate-of-change limiting value setting unit changes the setting via a primary delay filter to which a filter time constant is applied.

5. A DC/DC converter device according to claim 1, further comprising a first sensor configured to detect the input voltage supplied to the DC/DC converter,
   wherein the rate-of-change limiting value setting unit is configured to obtain as the index value a detected input voltage value detected by the first sensor,
   wherein, when the detected input voltage value is smaller than a first threshold value, the rate-of-change limiting value setting unit narrows the rate-of-change limiting range by changing the setting in such a direction as to lower an upper limit value of the rate-of-change limiting value, and
   wherein, when the detected input voltage value is larger than a second threshold value, the rate-of-change limiting value setting unit narrows the rate-of-change limiting range by changing the setting in such a direction as to raise a lower limit value of the rate-of-change limiting value.

6. A DC/DC converter device according to claim 2, further comprising a first sensor configured to detect the input voltage supplied to the DC/DC converter,
   wherein the rate-of-change limiting value setting unit is configured to obtain as the index value a detected input voltage value detected by the first sensor,
   wherein, when the detected input voltage value is smaller than a first threshold value, the rate-of-change limiting value setting unit narrows the rate-of-change limiting range by changing the setting in such a direction as to lower an upper limit value of the rate-of-change limiting value, and
   wherein, when the detected input voltage value is larger than a second threshold value, the rate-of-change limiting value setting unit narrows the rate-of-change limiting range by changing the setting in such a direction as to raise a lower limit value of the rate-of-change limiting value.

7. A DC/DC converter device according to claim 3, further comprising a first sensor configured to detect the input voltage supplied to the DC/DC converter,
   wherein the rate-of-change limiting value setting unit is configured to obtain as the index value a detected input voltage value detected by the first sensor,
   wherein, when the detected input voltage value is smaller than a first threshold value, the rate-of-change limiting value setting unit narrows the rate-of-change limiting range by changing the setting in such a direction as to lower an upper limit value of the rate-of-change limiting value, and
   wherein, when the detected input voltage value is larger than a second threshold value, the rate-of-change limiting value setting unit narrows the rate-of-change limiting range by changing the setting in such a direction as to raise a lower limit value of the rate-of-change limiting value.

8. A DC/DC converter device according to claim 4, further comprising a first sensor configured to detect the input voltage supplied to the DC/DC converter,
wherein the rate-of-change limiting value setting unit is configured to obtain as the index value a detected input voltage value detected by the first sensor,
wherein, when the detected input voltage value is smaller than a first threshold value, the rate-of-change limiting value setting unit narrows the rate-of-change limiting range by changing the setting in such a direction as to lower an upper limit value of the rate-of-change limiting value, and
wherein, when the detected input voltage value is larger than a second threshold value, the rate-of-change limiting value setting unit narrows the rate-of-change limiting range by changing the setting in such a direction as to raise a lower limit value of the rate-of-change limiting value.

9. A DC/DC converter device according to claim 1, further comprising a first sensor configured to detect the input voltage supplied to the DC/DC converter,
wherein the rate-of-change limiting value setting unit is configured to obtain as the index value an input voltage drop value calculated from a detected input voltage value detected by the first sensor,
wherein, when the input voltage drop value is larger than a third threshold value, the rate-of-change limiting value setting unit narrows the rate-of-change limiting range by changing the setting in such a direction as to lower an upper limit value of the rate-of-change limiting value, and
wherein, when the input voltage drop value is smaller than a fourth threshold value, the rate-of-change limiting value setting unit narrows the rate-of-change limiting range by changing the setting in such a direction as to raise a lower limit value of the rate-of-change limiting value.

10. A DC/DC converter device according to claim 2, further comprising a first sensor configured to detect the input voltage supplied to the DC/DC converter,
wherein the rate-of-change limiting value setting unit is configured to obtain as the index value an input voltage drop value calculated from a detected input voltage value detected by the first sensor,
wherein, when the input voltage drop value is larger than a third threshold value, the rate-of-change limiting value setting unit narrows the rate-of-change limiting range by changing the setting in such a direction as to lower an upper limit value of the rate-of-change limiting value, and
wherein, when the input voltage drop value is smaller than a fourth threshold value, the rate-of-change limiting value setting unit narrows the rate-of-change limiting range by changing the setting in such a direction as to raise a lower limit value of the rate-of-change limiting value.

11. A DC/DC converter device according to claim 3, further comprising a first sensor configured to detect the input voltage supplied to the DC/DC converter,
wherein the rate-of-change limiting value setting unit is configured to obtain as the index value an input voltage drop value calculated from a detected input voltage value detected by the first sensor,
wherein, when the input voltage drop value is larger than a third threshold value, the rate-of-change limiting value setting unit narrows the rate-of-change limiting range by changing the setting in such a direction as to lower an upper limit value of the rate-of-change limiting value, and
wherein, when the input voltage drop value is smaller than a fourth threshold value, the rate-of-change limiting value setting unit narrows the rate-of-change limiting range by changing the setting in such a direction as to raise a lower limit value of the rate-of-change limiting value.

12. A DC/DC converter device according to claim 4, further comprising a first sensor configured to detect the input voltage supplied to the DC/DC converter,
wherein the rate-of-change limiting value setting unit is configured to obtain as the index value an input voltage drop value calculated from a detected input voltage value detected by the first sensor,
wherein, when the input voltage drop value is larger than a third threshold value, the rate-of-change limiting value setting unit narrows the rate-of-change limiting range by changing the setting in such a direction as to lower an upper limit value of the rate-of-change limiting value, and
wherein, when the input voltage drop value is smaller than a fourth threshold value, the rate-of-change limiting value setting unit narrows the rate-of-change limiting range by changing the setting in such a direction as to raise a lower limit value of the rate-of-change limiting value.

13. A DC/DC converter device according to claim 1, further comprising a second sensor configured to detect a current flowing through the reactor in the DC/DC converter,
wherein the rate-of-change limiting value setting unit is configured to obtain as the index value a detected reactor current value detected by the second sensor,
wherein, when the detected reactor current value is larger than a fifth threshold value, the rate-of-change limiting value setting unit narrows the rate-of-change limiting range by changing the setting in such a direction as to lower an upper limit value of the rate-of-change limiting value, and
wherein, when the detected reactor current value is smaller than a sixth threshold value, the rate-of-change limiting value setting unit narrows the rate-of-change limiting range by changing the setting in such a direction as to raise a lower limit value of the rate-of-change limiting value.

14. A DC/DC converter device according to claim 2, further comprising a second sensor configured to detect a current flowing through the reactor in the DC/DC converter,
wherein the rate-of-change limiting value setting unit is configured to obtain as the index value a detected reactor current value detected by the second sensor,
wherein, when the detected reactor current value is larger than a fifth threshold value, the rate-of-change limiting value setting unit narrows the rate-of-change limiting range by changing the setting in such a direction as to lower an upper limit value of the rate-of-change limiting value, and
wherein, when the detected reactor current value is smaller than a sixth threshold value, the rate-of-change limiting value setting unit narrows the rate-of-change limiting range by changing the setting in such a direction as to raise a lower limit value of the rate-of-change limiting value.

15. A DC/DC converter device according to claim 3, further comprising a second sensor configured to detect a current flowing through the reactor in the DC/DC converter,
- wherein the rate-of-change limiting value setting unit is configured to obtain as the index value a detected reactor current value detected by the second sensor,
- wherein, when the detected reactor current value is larger than a fifth threshold value, the rate-of-change limiting value setting unit narrows the rate-of-change limiting range by changing the setting in such a direction as to lower an upper limit value of the rate-of-change limiting value, and
- wherein, when the detected reactor current value is smaller than a sixth threshold value, the rate-of-change limiting value setting unit narrows the rate-of-change limiting range by changing the setting in such a direction as to raise a lower limit value of the rate-of-change limiting value.

16. A DC/DC converter device according to claim 4, further comprising a second sensor configured to detect a current flowing through the reactor in the DC/DC converter,
- wherein the rate-of-change limiting value setting unit is configured to obtain as the index value a detected reactor current value detected by the second sensor,
- wherein, when the detected reactor current value is larger than a fifth threshold value, the rate-of-change limiting value setting unit narrows the rate-of-change limiting range by changing the setting in such a direction as to lower an upper limit value of the rate-of-change limiting value, and
- wherein, when the detected reactor current value is smaller than a sixth threshold value, the rate-of-change limiting value setting unit narrows the rate-of-change limiting range by changing the setting in such a direction as to raise a lower limit value of the rate-of-change limiting value.

17. A DC/DC converter device according to claim 5, wherein the rate-of-change limiting value setting unit is configured to obtain the index value in further consideration of a magnitude of the output voltage command value.

18. A DC/DC converter device according to claim 9, wherein the rate-of-change limiting value setting unit is configured to obtain the index value in further consideration of a magnitude of the output voltage command value.

19. A DC/DC converter device according to claim 13, wherein the rate-of-change limiting value setting unit is configured to obtain the index value in further consideration of a magnitude of the output voltage command value.

* * * * *